United States Patent
Soma et al.

(10) Patent No.: US 11,822,782 B2
(45) Date of Patent: Nov. 21, 2023

(54) INPUT DEVICE

(71) Applicant: ALPS ALPINE CO., LTD., Tokyo (JP)

(72) Inventors: Masahiro Soma, Miyagi (JP); Yasuji Hagiwara, Miyagi (JP); Keitaro Uchida, Miyagi (JP); Masahiro Takata, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/935,214

(22) Filed: Sep. 26, 2022

(65) Prior Publication Data

US 2023/0118137 A1  Apr. 20, 2023

(30) Foreign Application Priority Data

Oct. 14, 2021 (JP) .................................. 2021-168931

(51) Int. Cl.
*G06F 3/0482* (2013.01)
*G06F 3/04883* (2022.01)

(52) U.S. Cl.
CPC ........ *G06F 3/04883* (2013.01); *G06F 3/0482* (2013.01)

(58) Field of Classification Search
CPC .. G06F 3/04182; G06F 3/0488; G06F 3/0446; G06F 3/04847; G06F 3/0416; G06F 3/0482; G06F 3/0443; G06F 3/04842; G06F 3/048
See application file for complete search history.

(56) References Cited

U.S. PATENT DOCUMENTS

| | | | | |
|---|---|---|---|---|
| 5,825,352 A | * | 10/1998 | Bisset ................... | G06F 3/0488 345/157 |
| 6,411,283 B1 | * | 6/2002 | Murphy .................. | G06F 3/041 345/157 |
| 8,576,181 B2 | * | 11/2013 | Cho ..................... | G06F 3/04883 345/173 |
| 2009/0289914 A1 | * | 11/2009 | Cho ...................... | G06F 3/0393 345/173 |

(Continued)

FOREIGN PATENT DOCUMENTS

| | | | | | |
|---|---|---|---|---|---|
| JP | 2020043060 | * | 11/2020 | ............. | G06F 3/023 |
| WO | 2021/117446 | | 6/2021 | | |
| WO | WO-2021117446 A1 | * | 6/2021 | ........... | G06F 3/0416 |

*Primary Examiner* — Olga V Merkoulova
(74) *Attorney, Agent, or Firm* — IPUSA, PLLC

(57) ABSTRACT

An input device includes a display that displays buttons visible through an operation surface of a top panel, a detector that detects a center position of a finger facing the operation surface, and a distance from the operation surface to the finger, and a controller that controls the display based on a detector output and determines an input with respect to a button. The controller displays a cursor image on the display at a finger opposing position based on the finger center position, varies a cursor size according to the above described distance, determines a selected button based on the finger center position, and offsets a cursor center position from the finger center position, and surrounds the selected button with the cursor, in a case where the selected button protrudes from the cursor when the cursor center position is aligned to match the finger center position.

11 Claims, 17 Drawing Sheets

(56) References Cited

U.S. PATENT DOCUMENTS

| | | | |
|---|---|---|---|
| 2009/0327977 A1* | 12/2009 | Bachfischer | G06F 3/04883 715/863 |
| 2014/0013259 A1* | 1/2014 | Thomas | G06F 3/0488 715/771 |
| 2016/0092062 A1* | 3/2016 | Miyagi | G06F 3/017 345/173 |
| 2017/0153785 A1* | 6/2017 | Glaser | G06F 3/04883 |
| 2019/0121470 A1* | 4/2019 | Roziere | G06F 3/0488 |
| 2022/0291814 A1* | 9/2022 | Nakamura | G06F 3/04182 |

* cited by examiner

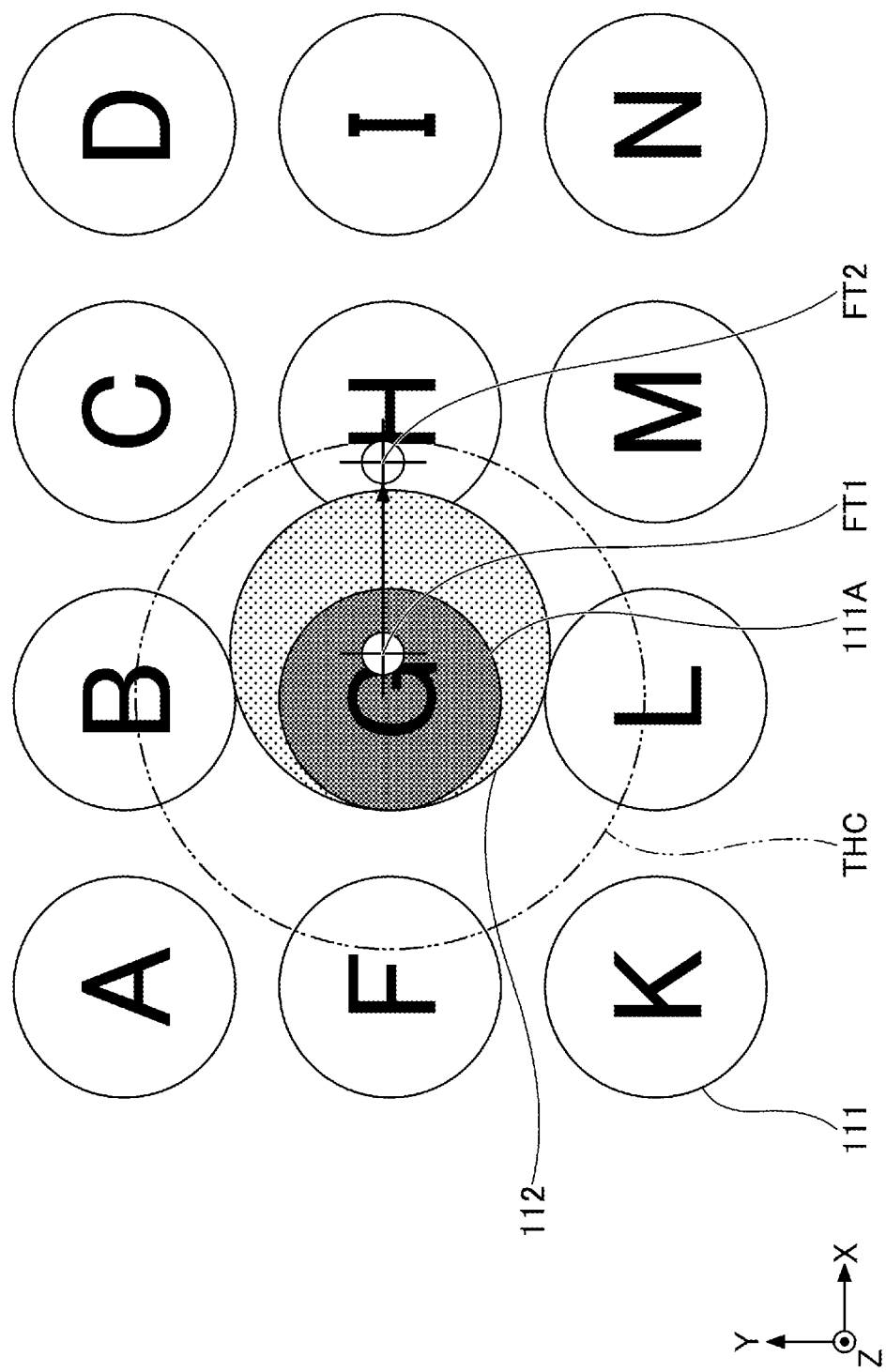

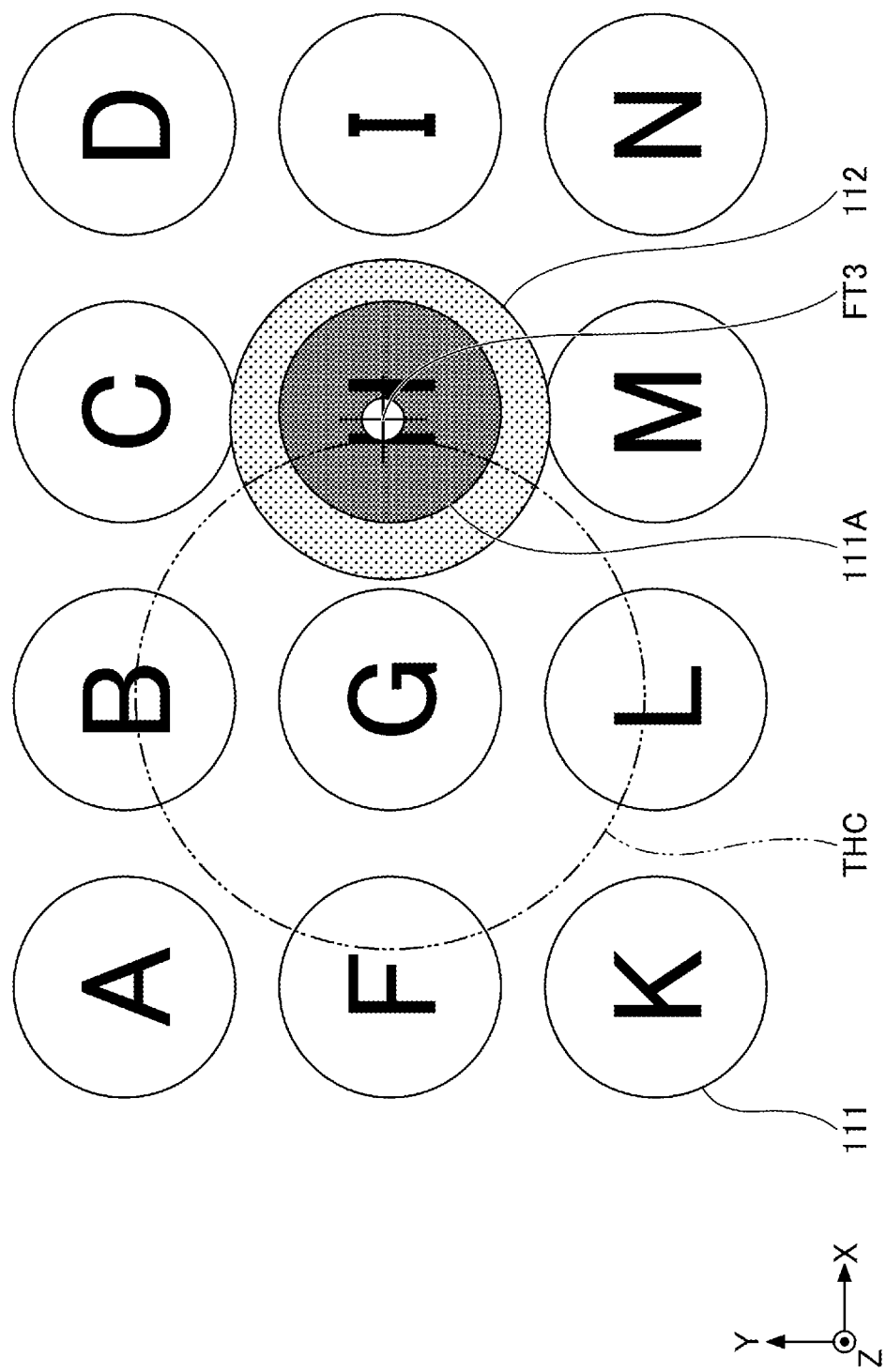

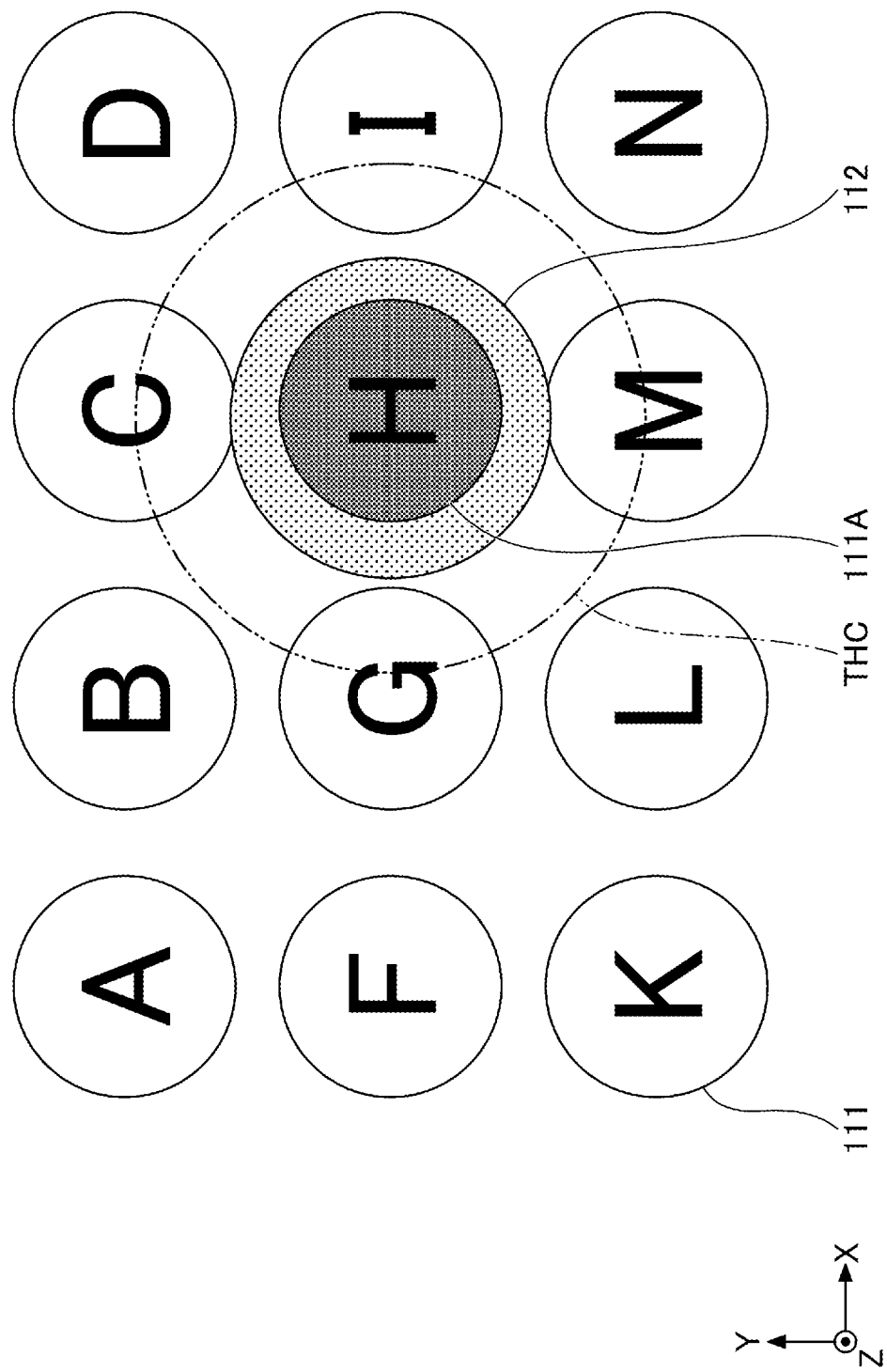

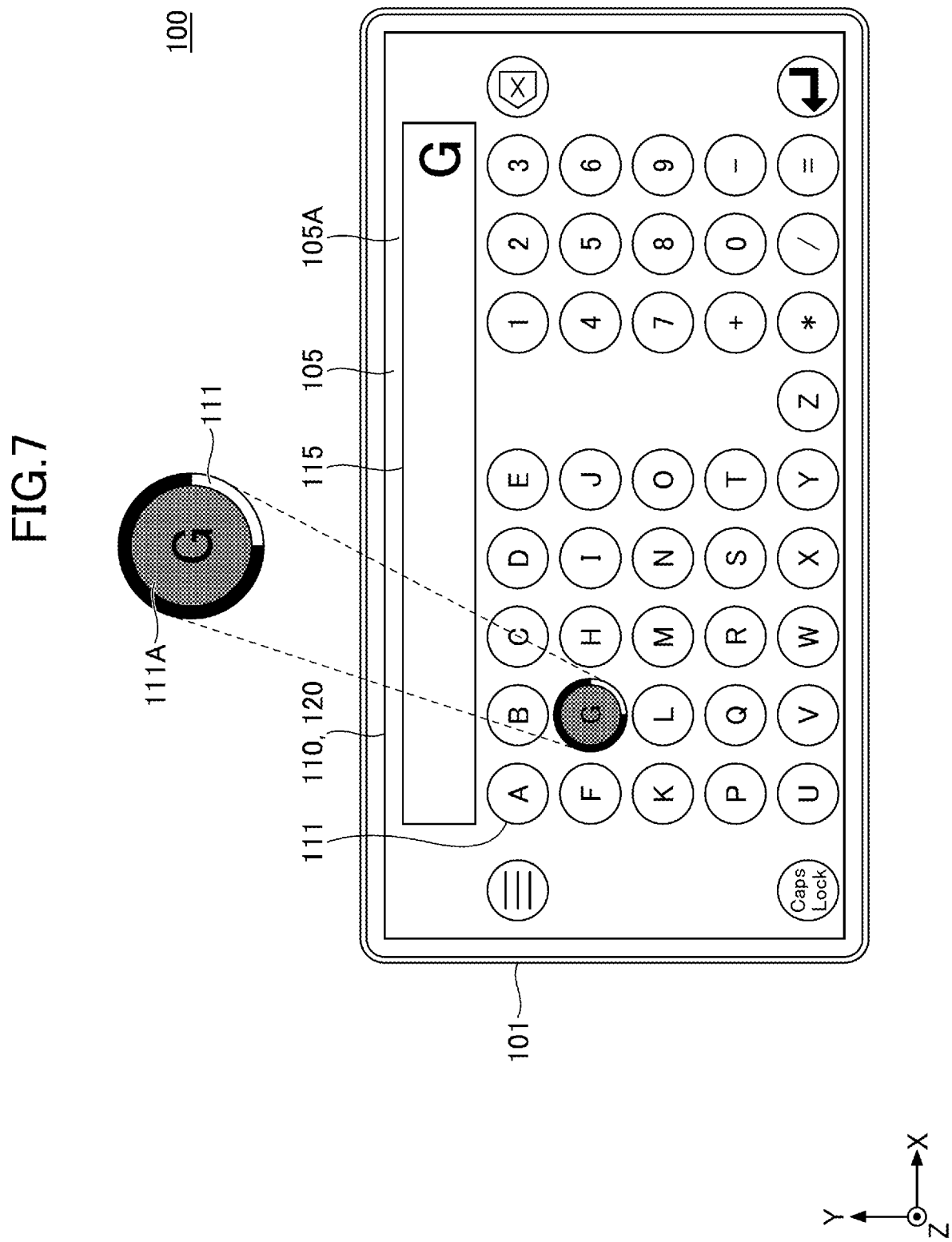

INPUT DEVICE

CROSS-REFERENCE TO RELATED APPLICATIONS

This application is based upon and claims priority to Japanese Patent Application No. 2021-168931, filed on Oct. 14, 2021, the entire contents of which are incorporated herein by reference.

BACKGROUND OF THE INVENTION

1. Field of the Invention

The present disclosure relates to input devices.

2. Description of the Related Art

A known input device includes a touchscreen panel to which a touch input by an operator body and a hover input can be made, and a display device capable of displaying a plurality of selection items. The input device includes a display controller for highlighting the selection item selected by the hover input, and a determination unit for determining one selection item as a selected item when a state where the one selection item is selected from the plurality of the selection items by the hover input continues for a predetermined time. The determination unit determines the one selection item as the selected item when the touch input with respect to the one selection item is detected before the predetermined time is reached. In addition, when the hover input is made, the display controller displays an operation frame, representing a distance from the operator body to an operation surface of the touchscreen panel, on the display device. The display controller displays displays the operation frame whose size decreases as the distance from the operator body to the operation surface of the touchscreen panel decreases. The determination unit determines the selection of the selection item when only one selection item is included inside the operation frame. For example, International Publication Pamphlet No. WO 2021/117446 proposes an input device of a type described above.

The control frame of the known input device is displayed similar to a cursor, and the selection item is an input key (Graphical User Interface (GUI) button) displayed by a GUI. According to the input device proposed in International Publication Pamphlet No. WO 2021/117446, the input key that is selected is easy to recognize because a spacing between two mutually adjacent input keys is sufficiently large with respect to a size of a finger. For this reason, in the input device proposed in International Publication Pamphlet No. WO 2021/117446, no special measures are taken to facilitate recognition of the selected input key.

SUMMARY OF THE INVENTION

One object according to an aspect of the present disclosure is to provide an input device that enables easy recognition of a selected GUI button, even when a spacing between two mutually adjacent GUI buttons is narrow.

According to an aspect of the present disclosure, an input device includes a top panel having an operation surface; a display configured to display an image of at least one GUI button visible through the operation surface; a detector configured to detect a center position of a finger facing the operation surface, and a distance from the operation surface to the finger; and a controller configured to control the image displayed on the display based on an output of the detector, and to determine a presence or an absence of an input with respect to the GUI button, wherein the controller performs a process including displaying an image of a cursor on the display at a position opposing the finger, based on the center position of the finger, varying a size of the cursor according to the distance between the operation surface and the finger, determining a selected GUI button of the at least one GUI button, based on the center position of the finger, and offsetting a center position of the cursor from the center position of the finger, and surrounding the selected GUI button with the cursor, in a case where the selected GUI button protrudes from the cursor when the center position of the cursor is aligned to match the center position of the finger.

Other objects and further features of the present disclosure will be apparent from the following detailed description when read in conjunction with the accompanying drawings.

BRIEF DESCRIPTION OF THE DRAWINGS

FIG. 5A is a diagram for explaining a time series operation upon selection;

FIG. 5B is a diagram for explaining the time series operation upon selection;

FIG. 5C is a diagram for explaining the time series operation upon selection;

FIG. 7 is a diagram illustrating the input device in a state where a hover input with respect to a selected GUI button is determined;

DESCRIPTION OF THE PREFERRED EMBODIMENTS

Embodiments and modifications of the input device according to the present disclosure, an applications of the input device, will be described in the following.

Embodiment

Figure 1:
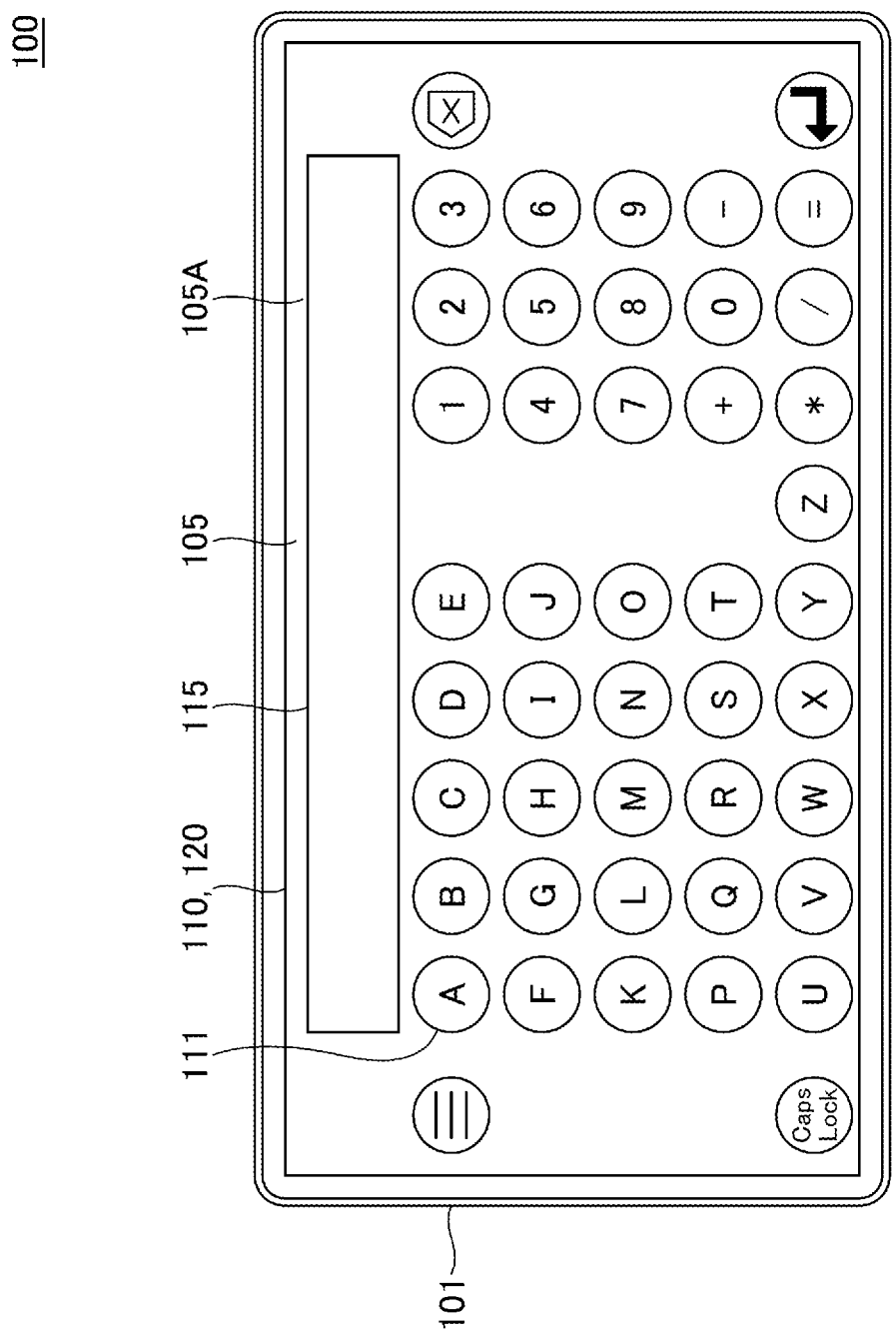
FIG. 1 is a diagram illustrating an example of a configuration of an input device according to one embodiment.
Figure 2:
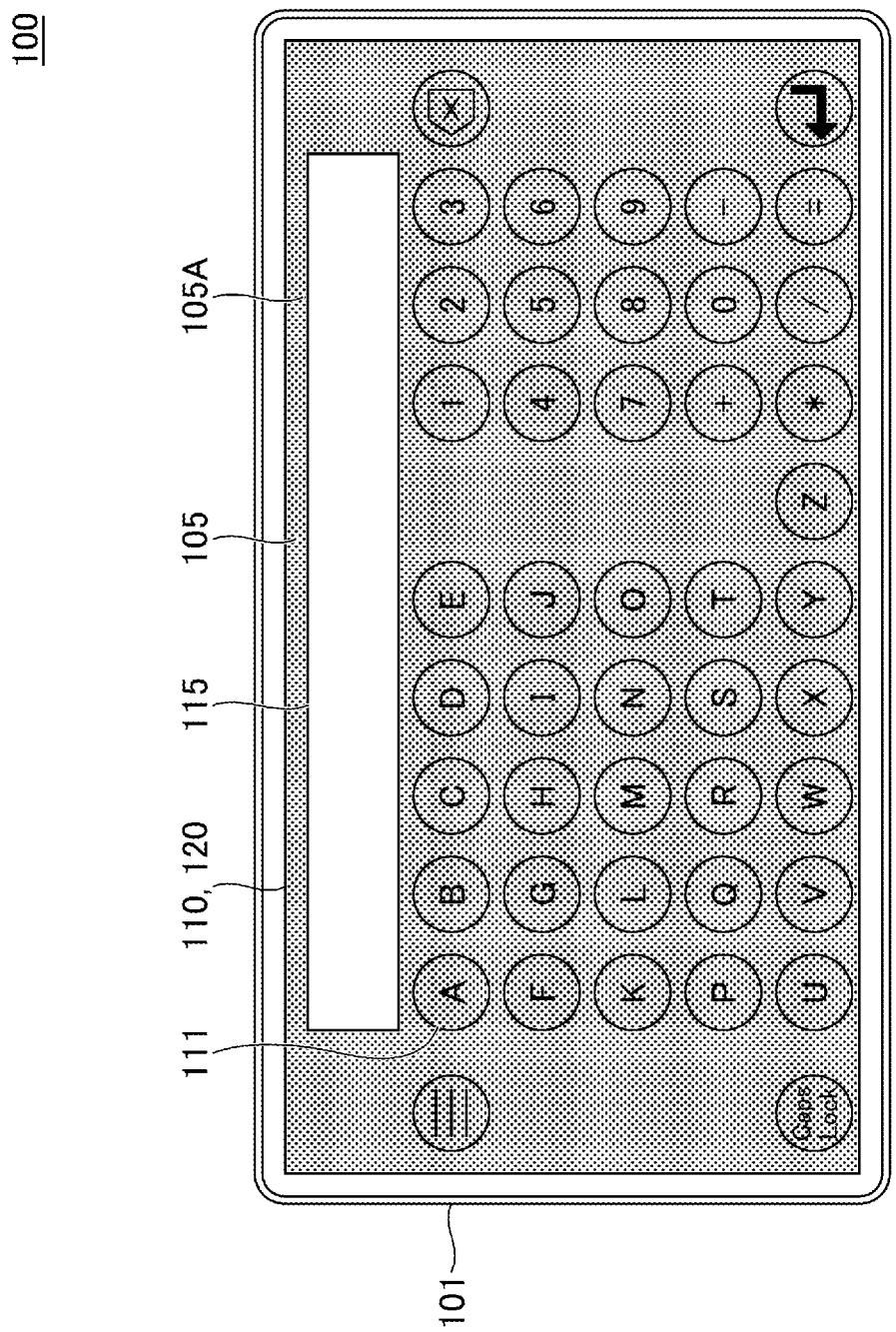
FIG. 2 is a diagram illustrating the example of the configuration of the input device according to one embodiment.
Figure 3:
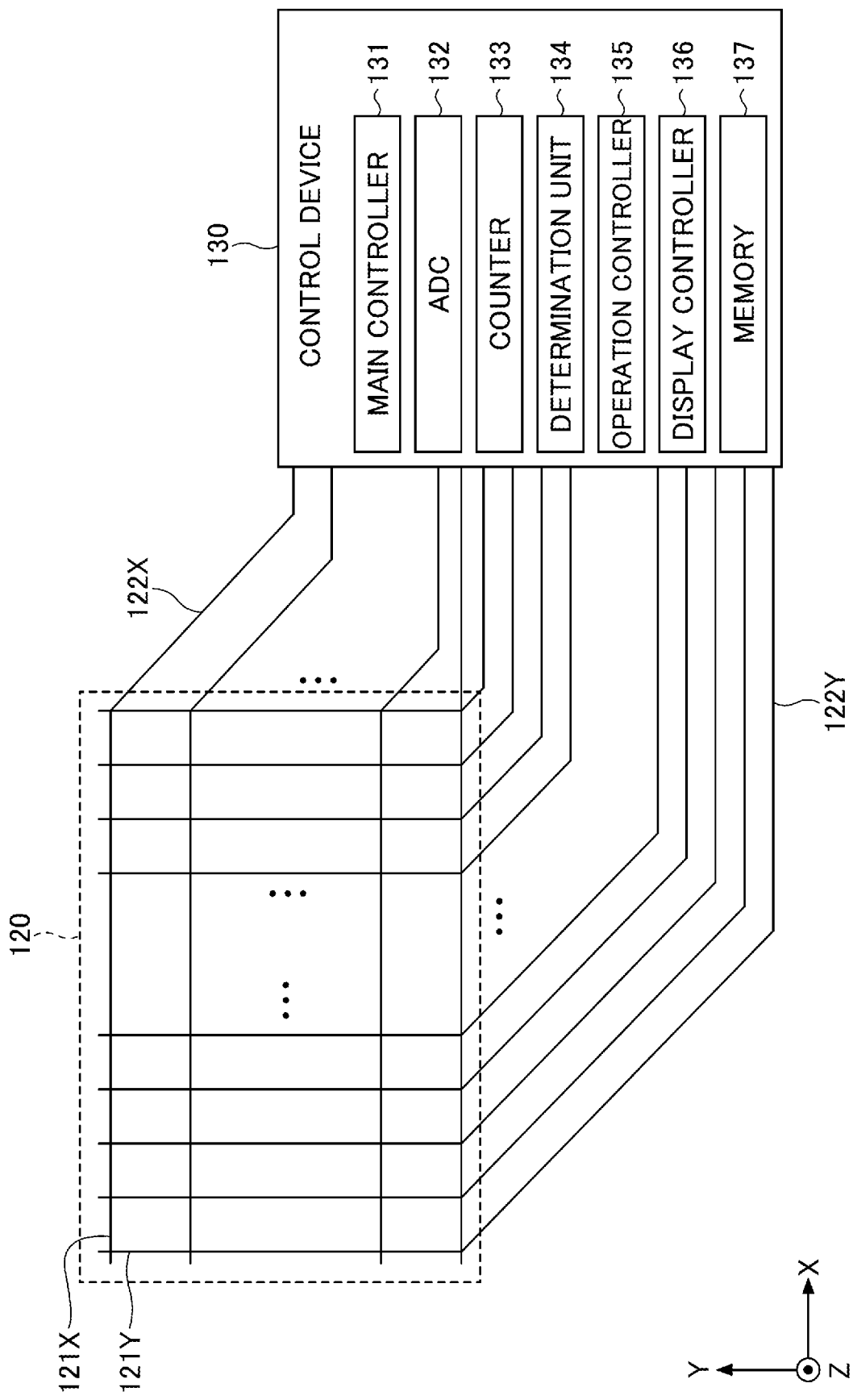
FIG. 3 is a diagram illustrating an example of configurations of an electrostatic sensor and a control device of the input device.

FIG. 1 and FIG. 2 illustrate an example of a configuration of an input device 100 according to one embodiment. FIG. 1 illustrates a state where the input device 100 is in an operating state, and a display device 110 is in a state displaying an input image. FIG. 2 illustrates a state where the input device 100 is in a standby state, and the display device 110 is in a state displaying a standby image. In the standby state, the display device 110 generally makes a display in gray, and a power consumption in this state is low. FIG. 3 is a diagram illustrating an example of configurations of an electrostatic sensor 120 and the control device 130 of the input device 100. The display device 110 is an example of a display, the electrostatic sensor 120 is an example of a detector, and the control device 130 is an example of a controller.

In the following description, various definitions are made using an XYZ coordinate system. A direction parallel to an X-axis (X-direction), a direction parallel to a Y-axis (Y-direction), and a direction parallel to a Z-axis (Z-direction) are perpendicular to one another. In addition, the −Z-direction refers to a direction approaching closer to the electrostatic sensor 120, and the +Z-direction refers to a direction separating further away from the electrostatic sensor 120. A plan view refers to a view of an XY-plane in a normal direction with respect to the XY-plane. In addition, lengths, widths, thicknesses, or the like of each part are not drawn to scale, and may be exaggerated to facilitate understanding of the configurations.

The input device 100 includes a housing 101, the display device 110, the electrostatic sensor 120, and the control device 130. Although the illustration of the control device 130 illustrated in FIG. 3 is omitted in FIG. 1 and FIG. 2, the control device 130 may be provided under the display device 110 and the electrostatic sensor 120 inside the housing 101, for example. The input device 100 includes the electrostatic sensor 120 and the control device 130 illustrated in FIG. 3.

The housing 101 is a case made of a resin, a metal, or the like, and accommodates the display device 110, the electrostatic sensor 120, and the control device 130. The display device 110 is disposed under the electrostatic sensor 120 that is transparent, for example, and is visible through an operation surface 105A. The operation surface 105A is a top surface of a transparent top panel 105 provided in an opening located at an upper portion of the housing 101.

The input device 100 is operable in a state where the finger tip is moved close to the operation surface 105A of the input device 100 in a contactless manner, that is, without touching the operation surface 105A. The input device 100 detects a position of the finger tip that is not touching the operation surface 105A, namely, an XY coordinate position and a Z-direction position from the operation surface 105A, and accepts an operation input in the contactless manner.

As will be described later in more detail, the XY coordinate position of the finger tip detected by the input device 100 using the electrostatic sensor 120 is the XY coordinate position with a highest electrostatic capacitance within a region where a finger tip FT is present, for example. Further, because the Z-direction position of the finger tip detected by the input device 100 using the electrostatic sensor 120 is inversely proportional to the electrostatic capacitance detected by the electrostatic sensor 120, determining the Z-direction position of the finger tip is equivalent to determining the electrostatic capacitance between the finger tip FT and the electrostatic sensor 120. The input device 100 determines the Z-direction position of the finger tip FT by the electrostatic capacitance between the finger tip FT and the electrostatic sensor 120, for example, but in the following description, the electrostatic capacitance is described as the Z-direction position of the finger tip FT in a case where the Z-direction position of the finger tip FT is easier to understand.

A contactless operation input refers to an operation made by the finger tip with respect to the input device 100, without touching the operation surface 105A by the finger tip. The contactless operation input may also be referred to as a hover input or a touchless input. The input device 100 can also accept a contact operation input by detecting the position of the finger tip touching the operation surface 105A. The contact operation input made by touching the operation surface 105A may also be referred to as a touch input.

Both the contactless operation input (hover input or touchless input) and the contact operation input (touch input) can be made in a similar manner with respect to the input device 100. However, in the following description, an example in which the contactless operation input is made will be described. Further, the contactless operation input may simply be referred to as the hover input.

The input device 100 may be an input unit of a tablet-type input device or an Automatic Teller Machine (ATM) disposed at a store, a facility, or the like, and used by an unspecified number of users. The input device 100 may also be an input unit of a cooking electric appliance that needs to maintain a clean state. Moreover, the input device 100 may be a tablet computer, a smartphone, a game machine, or the like used by an individual.

The display device 110 may be a Liquid Crystal Display (LCD), an Organic Electro Luminescence Display (OELD), or the like, for example. The display device 110 provides a display for implementing a Graphic User Interface (GUI). The display device 110 displays an image of GUI buttons 111, a cursor, and an image of an input content display part 115 for displaying input contents. The GUI buttons 111 are disposed in a matrix arrangement in the plan view, for example. The GUI button 111 has a circular shape simulating a push button, for example. The cursor will be described later, with reference to FIG. 4A.

FIG. 1 through FIG. 3 illustrate, as an example, a total of 45 GUI buttons 111, including 26 GUI buttons 111 of alphabetic keys, 15 GUI buttons 111 in a tenkey format including numeric keys or the like, and 4 GUI buttons 111 of menu keys. The 4 menu keys include a key on an upper left and indicated by three horizontal lines, a capital lock key on the lower left and indicated by "Caps Lock", a backspace key on the upper right and indicated by a leftward white arrow labeled with an "x" mark), and an enter key on the lower left and indicated by a downward arrow with corner leftward. The 45 GUI buttons 111 include 5 rows of GUI buttons 111, and 11 columns of GUI buttons 111. Each row extends in the X-direction, and the 5 rows are arranged along the Y-direction. Each column extends in the Y-direction, and the 11 columns are arranged along the X-direction. The GUI buttons 111 are not limited to the alphabetic keys and the tenkey including the numeric keys, and may be keys of characters in various languages, symbols, or the like.

The electrostatic sensor 120 is disposed on top of the display device 110 in a manner overlapping the display device 110. As illustrated in FIG. 3, the electrostatic sensor 120 includes a plurality of sensor electrodes 121X extending in the X-direction, and a plurality of sensor electrodes 121Y extending in the Y-direction. The sensor electrodes 121X and 121Y are an example of electrodes of the detector (or detector electrodes), and the sensor electrodes 121X and 121Y are electrically connected to the control device 130 via interconnects 122X and 122Y, respectively. For example, an electrostatic sensor having a transparent conductor film made of Indium Tin Oxide (ITO) or the like famed on a surface of a transparent glass, and the sensor electrodes 121X and 121Y and the interconnects 122X and 122Y formed by patterning the transparent conductor film, may be used for the electrostatic sensor 120. The electrostatic capacitance detected by the electrostatic sensor 120 is input to the control device 130.

FIG. 3 illustrates, as an example, the plurality of sensor electrodes 121X and the plurality of sensor electrodes 121Y. A spacing between two mutually adjacent sensor electrodes 121X, and a spacing between two mutually adjacent sensor electrodes 121Y, are both narrower than a spacing between two mutually adjacent GUI buttons 111.

The plurality of sensor electrodes 121X is scanned one row by one row, and the plurality of sensor electrodes 121Y is scanned one column by one column. An Analog-to-Digital Converter (ADC) 132 converts the electrostatic capacitance at a plurality of intersections between the plurality of sensor electrodes 121X and the plurality of sensor electrodes 121Y into a digital value. A counter 133 counts the amount of change in the output of the ADC 132, and outputs a differential value ΔAD at each intersection. A resolution determined by the spacing of the sensor electrodes 121X and the spacing of the sensor electrodes 121Y can be increased using interpolation. In this case, the spacing of the sensor electrodes 121X and the spacing of the sensor electrodes 121Y may be wider than the spacing of the GUI buttons 111. Further, although not illustrated, when using the interpolation, the GUI button 111 and a sensor electrode having approximately the same size as the GUI button 111, may be arranged in a 1:1 correspondence with each other.

The control device 130 may be implemented in a computer including a Central Processing Unit (CPU), a storage including a Random Access Memory (RAM) and a Read Only Memory (ROM), an input-output (I/O) interface, an internal bus, or the like.

The control device 130 includes a main controller 131, the ADC 132, the counter 133, a determination unit 134, an operation controller 135, a display controller 136, and a memory 137. The main controller 131, the ADC 132, the counter 133, the determination unit 134, the operation controller 135, and the display controller 136 may be functional blocks capable of performing functions of the control device 130 that performs the functions by executing one or more programs. The memory 137 may be a functional block capable of performing functions of the storage of the control device 130.

The main controller 131 is a processing unit that supervises processes of the control device 130, and may perform processes other than the processes performed by the ADC 132, the counter 133, the determination unit 134, the operation controller 135, and the display controller 136. For example, the main controller 131 scans the plurality of sensor electrodes 121X and the plurality of sensor electrodes 121Y.

The ADC 132 converts an output of the electrostatic sensor 120 into a digital value. The output of the ADC 132 is a detection value of the electrostatic capacitance at each intersection of the sensor electrodes 121X and 121Y of the electrostatic sensor 120. The counter 133 counts the amount of change in the output of the ADC 132, with respect to a reference value, and outputs the differential value ΔAD. The differential value ΔAD is the counted value of the amount of change in the output of the ADC 132 with respect to the reference value. The reference value is the electrostatic capacitance at each intersection of sensor electrodes 121X and 121Y in a case where no finger is located in a periphery of the sensor electrodes 121X and 121Y. The differential value ΔAD is the electrostatic capacitance between each intersection of the sensor electrodes 121X and 121Y and the finger.

The differential value ΔAD is obtained for each intersection. The ADC 132 converts the electrostatic capacitance at each intersection of the sensor electrodes 121X and 121Y into the digital value, and the counter 133 counts the amount of change in the output of the ADC 132, with respect to the reference value, and outputs the differential value ΔAD for each intersection.

The determination unit 134 determines the XY coordinate position of the finger tip in the contactless state with respect to the operation surface 105A, and the Z-direction position of the finger from the operation surface 105A, based on the differential value ΔAD output from the counter 133. In the input device 100, the determination unit 134 determines a tip end position of the finger tip (XY coordinate position and Z-direction position), as a hover input position of the hover input performed by the user. A determination performed by the determination unit 134 will be described later, with reference to flow charts.

The operation controller 135 controls the operation of the input device 100, based on the hover input position determined by the determination unit 134. The display controller 136 controls the display of the display device 110, based on the hover input position determined by the determination unit 134. The memory 137 stores the programs and data that are used when the main controller 131, the determination unit 134, the operation controller 135, and the display controller 136 execute the respective processes. The memory 137 also stores data representing the number of rows and the number of columns of the sensor electrodes 121X and 121Y.

Cursor 112 and Threshold Value in XY Coordinates

Figure 4A:
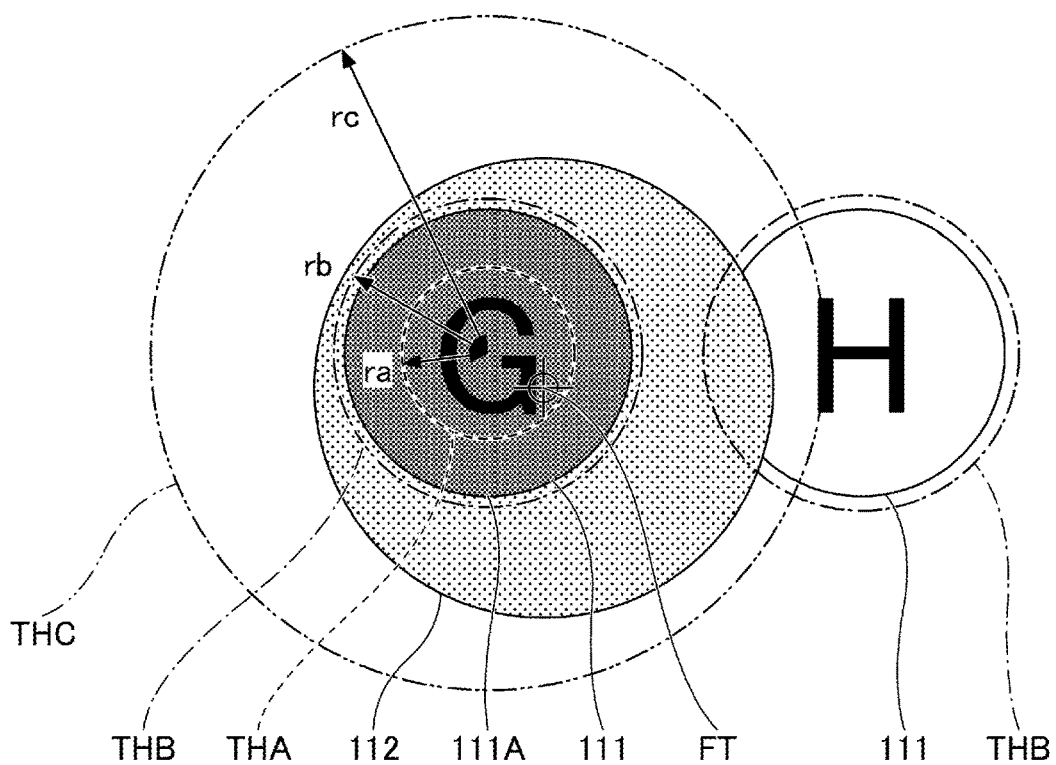
FIG. 4A is a diagram for explaining a GUI button, a selection circle, a cursor, and a range of a threshold value in XY coordinates.

FIG. 4A is a diagram for explaining the GUI button 111, a selection circle (or disk) 111A, a cursor 112, and a range of a threshold value in XY coordinates. FIG. 4A illustrates the GUI buttons 111 of alphabetic keys G and H, the position of the finger tip FT, the selection circle 111A, the cursor 112, and a range of a circle defined by the threshold value.

The position of the finger tip FT is indicated by a combination of a cross and a circle (hereinafter referred to as a "cross-shaped symbol"). The position of the finger tip FT is the tip end position of the finger extending linearly from the +Z-direction with respect to the operation surface 105A, and the cross of the cross-shaped symbol represents the XY coordinate position of the finger tip FT detected by the control device 130 based on the output of the electrostatic sensor 120. The XY coordinates representing the XY coordinate position of the finger tip FT are the XY coordinates with the highest electrostatic capacitance in the region where the finger tip FT is present, for example. In order to eliminate the effects of noise, a vertex of a parabola approximated from a distribution of the electrostatic capacitance along the X-axis by the method of least squares is regarded as the X coordinate, and a vertex of a parabola approximated from a distribution of the electrostatic capacitance along the Y-axis by the method of least squares is regarded as the Y coordinate, for example. The position of the finger tip FT obtained in this manner is an example of a center position of the finger. In the following description, the position of the cross of the cross-shaped symbol is regarded as the XY coordinate position of the finger tip FT.

In this example, the XY coordinate position of the finger tip FT is located inside the GUI button 111 of the alphabetic key G, thereby selecting the GUI button 111 of the alphabetic key G. It is assumed that the finger tip FT is sufficiently close to the operation surface 105A such that the GUI button 111 of the alphabetic key G is selectable, and FIG. 4A describes the position of the cursor 112 and the range of threshold value in relation to the XY coordinate position of the finger tip FT.

The selection circle 111A is displayed inside the entirety of the selected GUI button 111. In FIG. 4A, the selection circle 111A is indicated in gray halftone. The selection circle 111A is a highlighting display for enabling the selected GUI button 111 to be visually distinguishable from unselected GUI buttons 111. The display of the selection circle 111A overlaps the entirety of the display of the selected GUI button 111, for example.

Because the GUI button 111 has a circular shape in this example, the selection circle 111A also has a circular shape. In a case where the GUI button 111 has a shape other than the circular shape, a highlighting display for making the selected GUI button 111 visually distinguishable in place of the selection circle 111A may have a shape similar to the shape of the GUI button 111. Alternatively, a highlighting display for highlighting a portion of the selected GUI button 111, may be used in place of the selection circle 111A. Further, instead of displaying the selection circle 111A, the selected GUI button 111 may be made visually distinguishable from the unselected GUI buttons 111 by causing the selected GUI button 111 to flash or the like.

The cursor 112 has a circular shape in this example. Although the cursor 112 has the circular shape in the example described in the following, the cursor 112 may have an arbitrary convex shape. The convex shape of the cursor 112 makes it easier to determine whether or not the selected GUI button 111 protrudes from the cursor 112. Further, when the cursor 112 has the circular shape, it is even easier to determine whether or not the selected GUI button 111 protrudes from the cursor 112.

The size of the cursor 112 is proportional to the distance between the finger tip FT and the operation surface 105A. In other words, the size of the cursor 112 is inversely proportional to a magnitude of the electrostatic capacitance detected by the electrostatic sensor 120. However, in the following description, it is assumed for the sake of convenience that the Z-direction position of the finger tip FT with respect to the operation surface 105A is in a stable state sufficiently close to the operation surface 105A such that the GUI button 111 of the alphabetic key G is selectable. The selection and determination based on a positional relationship between the finger tip FT and the operation surface 105A will be described later, with reference to FIG. 6A through FIG. 6G.

In FIG. 4A, the GUI button 111 of the alphabetic key G is selected, and the display of the selection circle 111A overlaps (or is superimposed with respect to) the display of the selected GUI button 111. The selection circle 111A is displayed in dark gray. The cursor 112 is displayed in light gray, and surrounds the selected GUI button 111 of the alphabetic key G. For example, the GUI button 111 is transparent, the selection circle 111A is semi-transparent, and the image of the GUI button 111 is displayed in front of the image of the selection circle 111A. The image of the selection circle 111A is displayed in front of the image of the cursor 112.

A state where the image of the GUI button 111 is displayed in front of the image of the selection circle 111A, refers to the state where the image of the GUI button 111 is superimposed on the image of the selection circle 111A. The front refers to a near side where the display of the display device 110 is visible to the user. In other words, the image of the selection circle 111A is displayed on the back of the image of the GUI button 111. The back refers to a far side on the opposite side from the front, that is, the side where the display of the display device 110 is visible but is farther away from the front in a line of vision of the user.

A state where the image of the selection circle 111A is displayed in front of the image of the cursor 112 refers to the state where the image of the selection circle 111A is superimposed on the image of the cursor 112 at a portion where the selection circle 111A overlaps the cursor 112. In other words, with respect to the portion where the selection circle 111A overlaps the cursor 112, the image of the cursor 112 is displayed on the back of the image of the selection circle 111A.

The GUI button 111 of the alphabetic key H is in an unselected state and is indicated in white. The image of a portion of the GUI button 111 of the alphabetic key H overlapping the cursor 112 is displayed on the back of the image of the cursor 112. For this reason, the image of the selected GUI button 111, the image of the selection circle 111A, the image of the cursor 112, and the image of the unselected GUI button 111 are displayed in this order, from the front to the back, that is, from the near side to the far side in the line of vision of the user.

The display may actually be made in color. In this case, the selection circle 111A may be displayed in a conspicuous color, such as yellow or the like, the cursor 112 may be displayed in a color, such as blue or the like less conspicuous than the color of the selection circle 111A, and the unselected GUI button 111 may be displayed in a color, such as white, light gray, or the like enabling a boundary with portions other than the GUI button 111 to be easily recognizable, for example. Because the image of the GUI button 111 is transparent, the color of the selection circle 111A on the back is transmitted through the GUI button 111 in the front, thereby displaying the selected GUI button 111 in the color of the selection circle 111A.

FIG. 4A illustrates a range of a cursor fixing threshold value THA by a dashed line, on the inner side of the selected GUI button 111 of the alphabetic key G, a range of the selection circle threshold value THB by a one-dot chain line, slightly on the outer sides of the GUI buttons 111 of the alphabetic keys G and H, and a range of a cursor moving threshold value THC by a two-dot chain line, on the outer side of the selected GUI button 111 of the alphabetic key G. The range of the cursor fixing threshold value THA, the range of the selection circle threshold value THB, and the range of the cursor moving threshold value THC are centered around a center of the selected GUI button 111 of the alphabetic key G, and are surrounded by circles having radii ra, rb, and rc around the center of the selected GUI button 111 of the alphabetic key G, respectively. The cursor fixing threshold value THA, the selection circle threshold value THB, and the cursor moving threshold value THC represent the radii (or distances) ra, rb, and rc from the center of the selected GUI button 111 of the alphabetic key G, respectively. For this reason, the cursor fixing threshold value THA, the selection circle threshold value THB, and the cursor moving threshold value THC represent the threshold values in the XY coordinates. The radii (or distances) ra, rb, and rc are constant values.

In order to describe the case where the GUI button 111 of the alphabetic key G is selected, the range of the cursor fixing threshold value THA is illustrated on the inner side of the GUI button 111 of the alphabetic key G, and the range of the cursor moving threshold value THC is illustrated on the outer side of the GUI button 111 of the alphabetic key G by the two-dot chain line. In a case where the GUI button 111 of an alphabetic key other than the alphabetic key G is selected, the ranges of the cursor fixing threshold value THA and the cursor moving threshold value THC may be provided in a similar manner.

Because the selection circle threshold value THB is a threshold value set for all of the GUI buttons 111, the range of the selection circle threshold value THB is illustrated slightly on the outer sides of the GUI buttons 111 of the alphabetic keys G and H in FIG. 4A. But actually, the range of the selection circle threshold value THB is equal to a display area of each of the GUI buttons 111 of the alphabetic keys G and H, for example. The same holds true for the GUI buttons 111 other than GUI buttons 111 of the alphabetic keys G and H. The position of the finger tip FT, the range of the cursor fixing threshold value THA, the range of the selection circle threshold value THB, and the range of the cursor moving threshold value THC are not displayed on the display device 110, and are merely illustrated in FIG. 4A for the sake of convenience to facilitate the understanding of the display. The same applies to the other figures referred to in the following description.

The cursor fixing threshold value THA is a threshold (or radius ra) for fixing the position of the cursor 112 so as to include the selected GUI button 111. The cursor fixing threshold value THA is provided to match the center of the cursor 112 to a center of the finger tip FT when the position of the finger tip FT is within the range of the cursor fixing threshold value THA inside the selected GUI button 111. That is, when the position of the finger tip FT moves within the range of the cursor fixing threshold value THA within the selected GUI button 111, the position of the center of the cursor 112 is aligned to match the XY coordinate position of the finger tip FT.

The selection circle threshold value THB is provided to select a GUI button 111 when the position of the finger tip FT enters within the range of the selection circle threshold value THB in a state where no GUI button 111 is selected. That is, when a distance D between the XY coordinate position of the finger tip FT and the center of the GUI button 111 is less than or equal to the radius rb (D<=rb), this GUI button 111 is selected.

The cursor moving threshold value THC is provided to deselect (or cancel) the selected GUI button 111. For example, when the finger tip FT is outside the range of the cursor moving threshold value THC for the GUI button 111 of the alphabetic key G and moves within the range of the selectable circular threshold value THB for the GUI button 111 of the alphabetic key H, the GUI button 111 of the alphabetic key H is selected. In addition, when the finger tip FT is outside the range of the cursor moving threshold value THC of GUI button 111 of the alphabetic key G, and is outside the range of the selection circle threshold value THB for all of the GUI buttons 111, no GUI button 111 is selected. When no GUI button 111 is selected, the center of the cursor 112 is aligned to match the center of the finger tip FT.

Because the range of the cursor moving threshold value THC extends beyond and outside the GUI button 111, even when the position of the finger tip FT moves outside the GUI button 111, the selected state of the GUI button 111 is maintained as long as the position of the finger tip FT is within the range of the cursor moving threshold value THC.

However, when the selected GUI button 111 protrudes outside the cursor 112, it becomes difficult to recognize the selected GUI button 111. For this reason, when the position of the finger tip FT protrudes outside the range of the cursor fixing threshold value THA, the cursor 112 is displayed so that the center of the cursor 112 is offset from the position of the finger tip FT, the selected GUI button 111 is surrounded by the cursor 112, and the circle of the GUI button 111 inscribes the circle of the cursor 112. This is because, if the cursor 112 were moved centered around the position of the finger tip FT in a state where the position of the finger tip FT exceeds the range of the cursor fixing threshold value THA, the selected GUI button 111 would protrude from the cursor 112, thereby making it difficult to visually recognize the selection of this GUI button 111.

That is, in the case where the position of the finger tip FT exceeds the range of the cursor fixing threshold value THA, the selected GUI button 111 protrudes from the cursor 112 when the center position of the cursor 112 is aligned to match the position of the finger tip FT. For this reason, the cursor 112 is displayed so that the center of the cursor 112 is offset from the position of the finger tip FT, the selected GUI button 111 is surrounded by the cursor 112, and the circle of the GUI button 111 inscribes the circle of the cursor 112.

As described above, even when the position of the finger tip FT is outside the range of the cursor fixing threshold value THA, the selected state of the GUI button 111 is maintained when the distance D between the XY coordinate position of the finger tip FT and the center of the selected GUI button 111 is less than or equal to rc (D<=rc). In this state, the center of the cursor 112 is offset from the position of the finger tip FT toward the center of the GUI button 111, according to the position of the finger tip FT, so that the circle of the GUI button 111 inscribes the circle of the cursor 112. This operation will be described later, with reference to FIG. 5A through FIG. 5C.

Center of GUI Button 111 and Position of Finger Tip FT

Figure 4B:
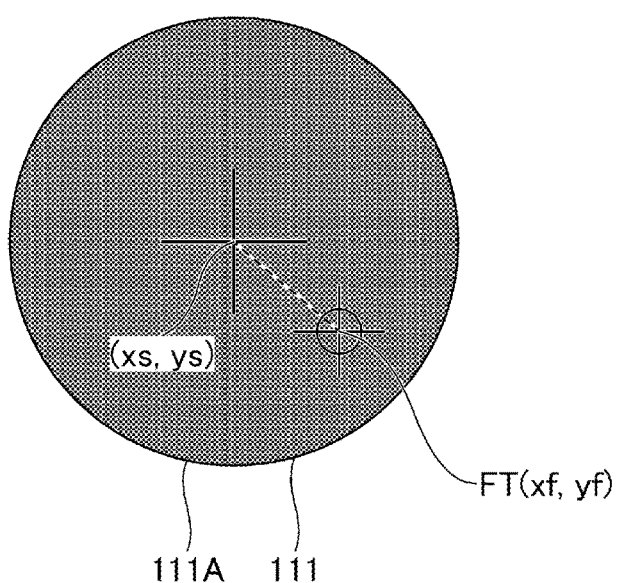
FIG. 4B is a diagram illustrating a center of the GUI button and a position of a finger tip FT.

FIG. 4B is a diagram illustrating the center of the GUI button 111 and the position of the finger tip FT. Because the GUI button 111 illustrated in FIG. 4B is selected, the display of the selection circle 111A overlaps the display of the GUI button 111. In FIG. 4B, the illustration of the alphabetic key or the like displayed on the GUI button 111 is omitted for the sake of convenience.

Coordinates of the center of the selected GUI button 111 are (xs, ys), and the XY coordinates of the position of the finger tip FT are (xf, yf). FIG. 4B illustrates a half-line connecting the center of the selected GUI button 111 and the position of the finger tip FT, by a dashed line. The distance D between the center of the selected GUI button 111 and the XY coordinate position of the finger tip FT, is the distance between a point having the coordinates (xs, ys) and a point having the coordinates (xf, yf), and can be represented by the following formula (1).

$$D=\{(xs-xf)^2+(ys-yf)^2\}^{1/2} \quad (1)$$

Operation Upon Selection

FIG. 5A through FIG. 5C are diagrams for explaining a time series operation upon selection. FIG. 5A through FIG. 5C illustrate 12 GUI buttons 111 of the alphabetic keys A through D, F through I, and K through N. FIG. 5A illustrates a state where the GUI button 111 of the alphabetic key G is selected. Hence, FIG. 5A illustrates the selection circle 111A as overlapping the GUI button 111 of the alphabetic key G, and the range of cursor moving threshold value THC surrounding the GUI button 111 of the alphabetic key G. Transitions are made from the state illustrated in FIG. 5A to states illustrated in FIG. 5B and FIG. 5C with lapse of time. In FIG. 5A through FIG. 5C, unselected GUI buttons 111 are indicated in white.

FIG. 5A illustrates the cursor 112 when the position of the finger tip FT moves from a position FT1 to a position FT2. The position FT1 is close to the center of GUI button 111, while the position FT2 is immediately in front (that is, on an inner side) of an outer edge of the range of the cursor moving threshold value THC. In a state where the finger tip FT moves from the position FT1 to the position FT2, the distance between the position of the finger tip FT and the center of the selected GUI button 111 is less than or equal to rc, and the selected state of the GUI button 111 is maintained. In this state, the center of the cursor 112 is offset from the position of the finger tip FT toward the center of the GUI button 111, so that the GUI button 111 is inscribes the cursor 112.

In FIG. 5B, the position of the finger tip FT is moved further in the +X-direction than the position FT2 illustrated in FIG. 5A, to a position FT3. Because the position FT3 is outside the range of the cursor moving threshold value THC for the GUI button 111 of the alphabetic key G, the selection of the GUI button 111 of the alphabetic key G is canceled, that the selected GUI button 111 is deselected. On the other hand, because the position FT3 is within the range of the selection circle threshold value THB for the GUI button 111 of the alphabetic key H, the GUI button 111 of the alphabetic key H is selected. For this reason, the display of the selection circle 111A overlaps the display of the GUI button 111 of the alphabetic key H, and the cursor 112 surrounds the GUI button 111 of the alphabetic key H. In order to describe the cancellation (or deselection) of the selected GUI button 111 of the alphabetic key G, the illustration of the range of the cursor moving threshold value THC for the GUI button 111 of the alphabetic key H is omitted in FIG. 4B.

In FIG. 5C, the range of the cursor moving threshold value THC is illustrated in a periphery of the GUI button 111 of the alphabetic key H, because the GUI button 111 of the alphabetic key H is selected in FIG. 5B. FIG. 5C does not illustrate the position of the finger tip FT, but the selected state of the GUI button 111 of the alphabetic key H is maintained, and the cursor 112 surrounding the GUI button 111 of the alphabetic key H is displayed, as long as the position of the finger tip FT is within the range of the cursor moving threshold value THC for the GUI button 111 of the alphabetic key H.

Operation Upon Determination

FIG. 6A through FIG. 6G are diagrams for explaining the time series operation upon selection. In each of FIG. 6A through FIG. 6G, an upper portion illustrates the position of the finger tip FT of a hand 10 with respect to the operation surface 105A, a cross section of the display device 110 and the electrostatic sensor 120, and a selection threshold value TH1 and a determination threshold value TH2. Further, in each of FIG. 6A through FIG. 6G, a lower portion illustrates the operation surface 105A, 9 GUI buttons 111 of the alphabetic keys A through C, F through H, and K through M, the selection circle 111A, the position of the finger tip FT, the cursor 112, and an annular indicator 113.

Selection Threshold Value TH1 and Definition Threshold Value TH2

The selection threshold value TH1 and the determination threshold value TH2 are threshold values used by the control device 130 when determining the position of the finger tip FT with respect to the operation surface 105A based on the electrostatic capacitance detected by the electrostatic sensor 120. In FIG. 6A through FIG. 6G, in order to enable visual recognition of the selection threshold value TH1 and the determination threshold value TH2, the selection threshold value TH1 and the determination threshold value TH2 are illustrated at positions located at distances from the operation surface 105A according to the electrostatic capacitances of the selection threshold value TH1 and the determination threshold value TH2. Because the determination threshold value TH2 represents an electrostatic capacitance higher than that represented by the selection threshold value TH1, a dashed line corresponding to the determination threshold value TH2 is closer to the operation surface 105A than a dashed line corresponding to the selection threshold value TH1.

The selection threshold value TH1 is used to determine whether or not the GUI button 111 is selected by a hover input. The determination threshold value TH2 is used to determine whether the selection of the selected GUI button 111 may be established by the hover input.

Hereinafter, the position of the dashed line corresponding to the selection threshold value TH1 from the operation surface 105A in the vertical direction may also be referred to as the position of the selection threshold value TH1, and the position of the dashed line corresponding to the determination threshold value TH2 from the operation surface 105A in the vertical direction may also be referred to as the position of the determination threshold value TH2.

When the finger tip FT is separated from the operation surface 105A by a distance greater than the position of the selection threshold value TH1, the electrostatic capacitance at all of the intersections of the electrostatic sensor 120 is lower than the selection threshold value TH1. When the finger tip FT approaches the operation surface 105A and reaches the position of the selection threshold value TH1, the electrostatic capacitance at the intersection of the electrostatic sensor 120 closest to the finger tip FT becomes equal to the selection threshold value TH1. In addition, when the finger tip FT becomes closer to the operation surface 105A than the position of the selection threshold value TH1, the electrostatic capacitance at the intersection of the electrostatic sensor 120 closest to the finger tip FT becomes higher than the selection threshold value TH1. The position of the selection threshold value TH1 is approximately 3 cm from the operation surface 105A, for example.

When the finger tip FT approaches the operation surface 105A to operate one of the GUI buttons 111 and reaches the position of the selection threshold value TH1, the GUI button 111 including the position of the finger tip FT is selected. Hence, the selection circle 111A is displayed inside the selected GUI button 111, and the cursor 112 is displayed to surround the selected GUI button 111. Because the diameter of the cursor 112 is inversely proportional to the magnitude of the electrostatic capacitance, the cursor 112 becomes smaller as the finger tip FT becomes closer to the operation surface 105A. Accordingly, the user can visually recognize that the finger tip FT is approaching the operation surface 105A.

When the finger tip FT approaches the operation surface 105A and reaches the position of the selection threshold value TH1, and none of the GUI buttons 111 include the position of the finger tip FT, none of the GUI buttons 111 are selected, and the cursor 112 centering on the position of the finger tip FT is displayed. The diameter of cursor 112 is inversely proportional to the magnitude of the electrostatic capacitance.

The same applies to the determination threshold value TH2. When the finger tip FT is separated from the operation surface 105A by a distance greater than the position of the determination threshold value TH2, the electrostatic capacitance at all of the intersections of the electrostatic sensor 120 is lower than the determination threshold value TH2. When the finger tip FT approaches the operation surface 105A and reaches the position of the determination threshold value TH2, the electrostatic capacitance at the intersection of the electrostatic sensor 120 closest to the finger tip FT becomes equal to the determination threshold value TH2. In addition, when the finger tip FT becomes closer to the operation surface 105A than the position of the determination threshold value TH2, the electrostatic capacitance at the intersection of the electrostatic sensor 120 closest to the finger tip FT becomes higher than the determination threshold value TH2. The position of the determination threshold value TH2 is approximately 1 cm from the operation surface 105A, for example.

When the position of the finger tip FT reaches the position of the determination threshold value TH2 in a state where one of the GUI buttons 111 is selected, a determination operation is performed to determine an input to the selected GUI button 111. In the state where the determination operation is being performed, the size of the cursor 112 becomes the same as the size of the GUI button 111, and the cursor 112 becomes hidden on the back side of the GUI button 111 to assume a non-displayed state, and the annular indicator 113 is displayed. When the determination operation is performed for a predetermined time or longer, the annular indicator 113 assumes a non-displayed state, and a concave image of the GUI button 111 is displayed, thereby determining the input to the selected GUI button 111. The user can visually recognize that the input is determined, that is, the determination of the input has been made, from the annular indicator 113 that assumes the non-displayed state, and the displayed image of the GUI button 111 that becomes the concave image.

Ring Indicator 113

The annular indicator 113 is an annular indicator displayed in front of and to overlap the selected GUI button 111, along an outer edge of the selected GUI button 111. Plotting (or displaying) of the annular indicator 113 starts when the position of the finger tip FT reaches the position of the determination threshold value TH2 by the hover input. When the position of the finger tip FT reaches the position of the determination threshold value TH2, a determination operation is performed to determine the selection of the GUI button 111. In this state, because the size of the cursor 112 is the same as the size of the GUI button 111 and becomes hidden on the back side of the GUI button 111, the cursor 112 becomes hidden from the display.

The annular indicator 113 represents an elapsed time (or duration) from the start of the determination operation, and a time remaining until the determination operation is completed. Although the operation associated with the hover input is described above, in a case where a touch input is made, the position of the finger tip FT becomes closer to the operation surface 105A than the position of the determination threshold value TH2, and the annular indicator 113 is displayed in a similar manner. Alternatively, in the case where the touch input is made, the input may be determined immediately, without displaying the annular indicator 113.

The annular indicator 113 is an indicator that extends an annular shape thereof in a clockwise direction from a 12 o'clock position (or top position) in the plan view while the hover input is made, and assumes a complete annular shape when the hover input is determined.

Description of Operation Illustrated in FIG. 6A Through FIG. 6G

Figure 6A:
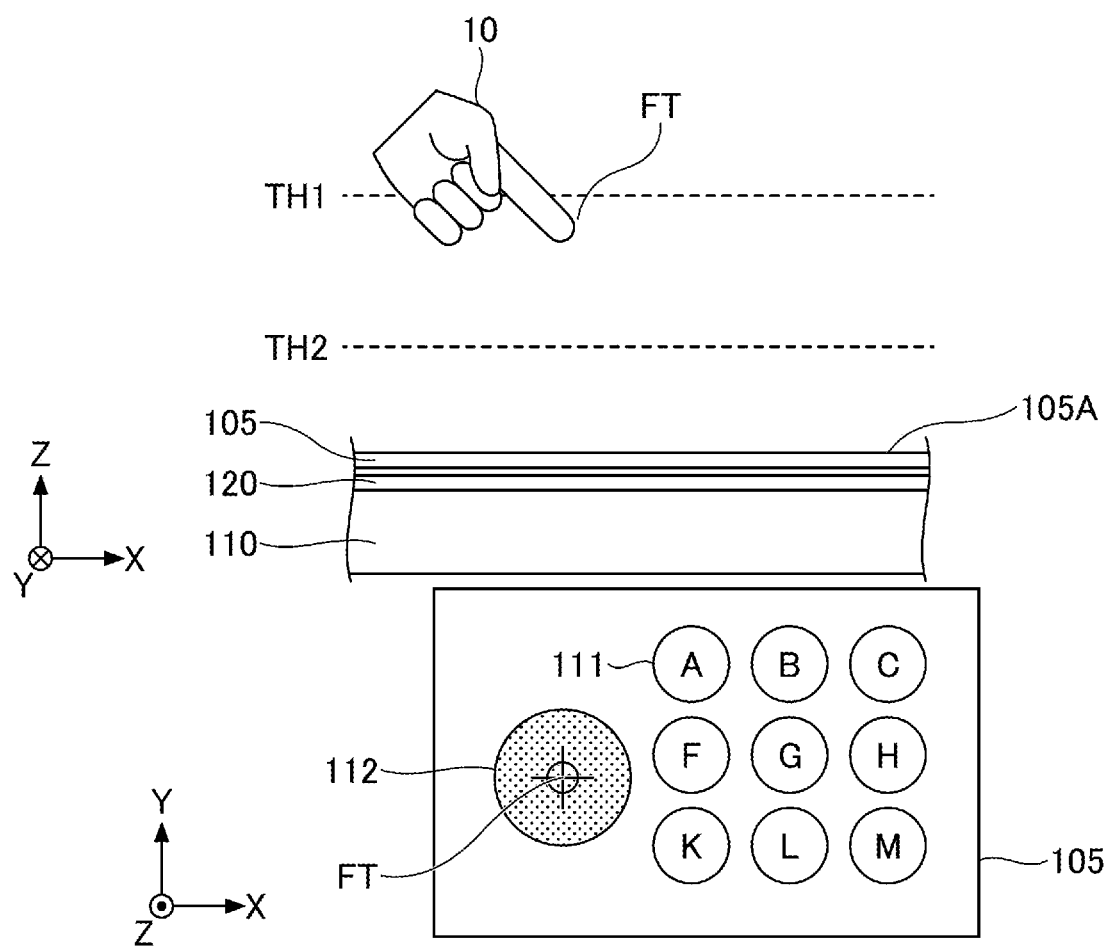
FIG. 6A is a diagram for explaining the time series operation upon selection.

In FIG. 6A, the finger tip FT reached the position of the selection threshold value TH1 in the Z-direction. Further, because the XY coordinate position of the finger tip FT is outside all of the GUI buttons 111, the cursor 112 centered around the position of the finger tip FT is displayed.

Figure 6B:
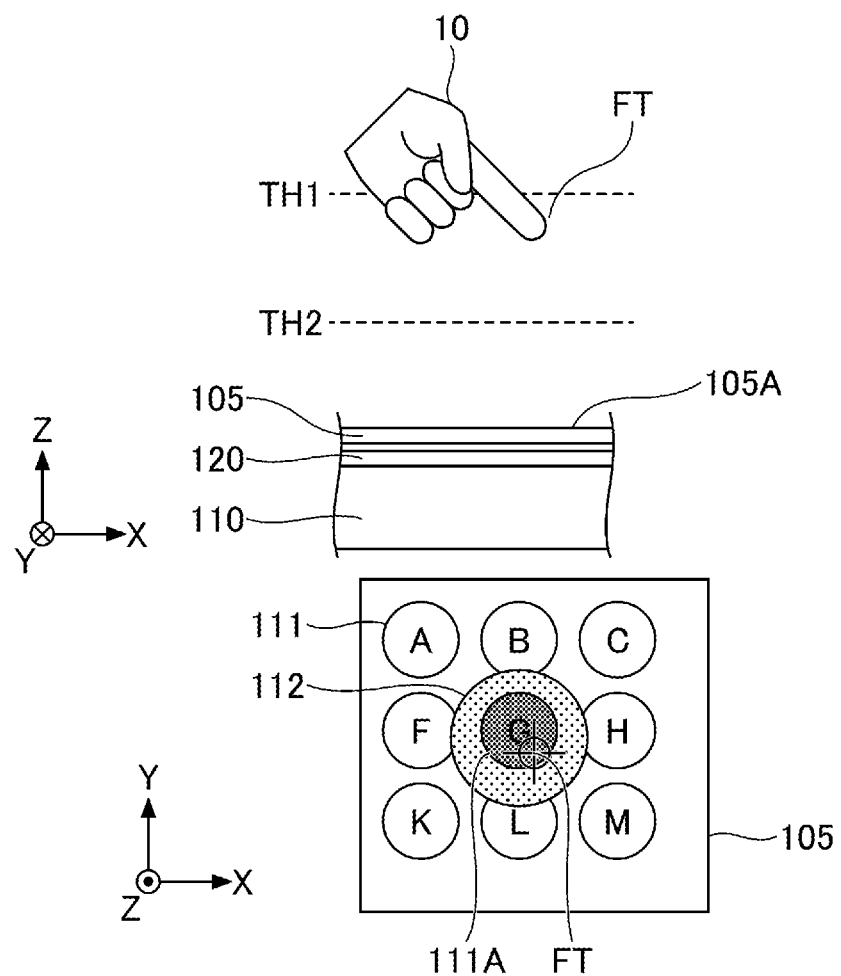
FIG. 6B is a diagram for explaining the time series operation upon selection.

In FIG. 6B, the Z-direction position of the finger tip FT remains unchanged from the state illustrated in FIG. 6A, and the XY coordinate position of the finger tip FT moves to a position inside the GUI button 111 of the alphabetic key G. For this reason, the display of the selection circle 111A overlaps the display of the GUI button 111 of the alphabetic key G. In this state, because the position of the finger tip FT is within the range of the cursor fixing threshold value THA (not illustrated), the cursor 112 is displayed so as to surround the selection circle 111A, and the circle of the cursor 112 does not inscribe the circle of the GUI button 111. The center of the cursor 112 is aligned to match the XY coordinate position of the finger tip FT.

Figure 6C:
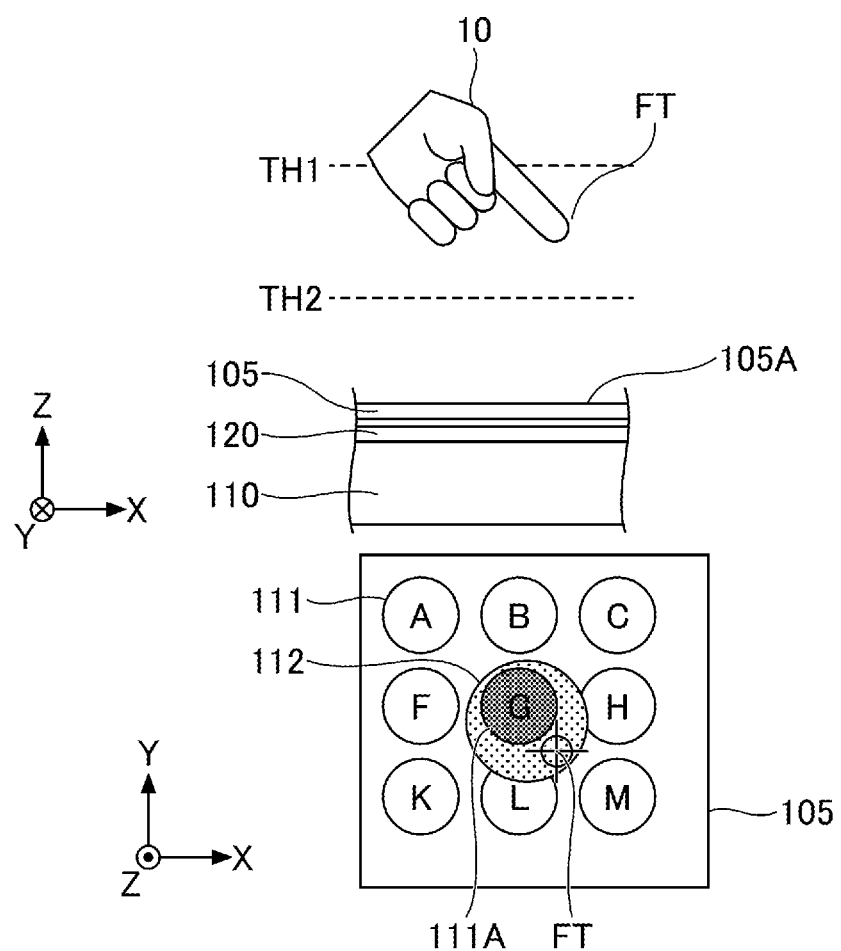
FIG. 6C is a diagram for explaining the time series operation upon selection.

In FIG. 6C, the finger tip FT approaches the operation surface 105A from the state illustrated in FIG. 6B, and the XY coordinate position of the finger tip FT moves outside the GUI button 111 of the alphabetic key G. However, because the XY coordinate position of the finger tip FT is within the range of the cursor moving threshold value THC for the GUI button 111 of the alphabetic key G, the selected state where the GUI button 111 of the alphabetic key G is maintained. Further, because the position of the finger tip FT exceeds the range of the cursor fixing threshold value THA (not illustrated), the center of the cursor 112 is offset more toward the center of the GUI button 111 of the alphabetic key G than the XY coordinate position of the finger tip FT, so that the circle of the GUI button 111 of the alphabetic key G inscribes the circle of the cursor 112. Hence, once the XY coordinate position of the finger tip FT enters inside the GUI button 111, the same GUI button 111 continues to be selected unless the position of the finger tip FT exceeds the range of the cursor moving threshold value THC.

Figure 6D:
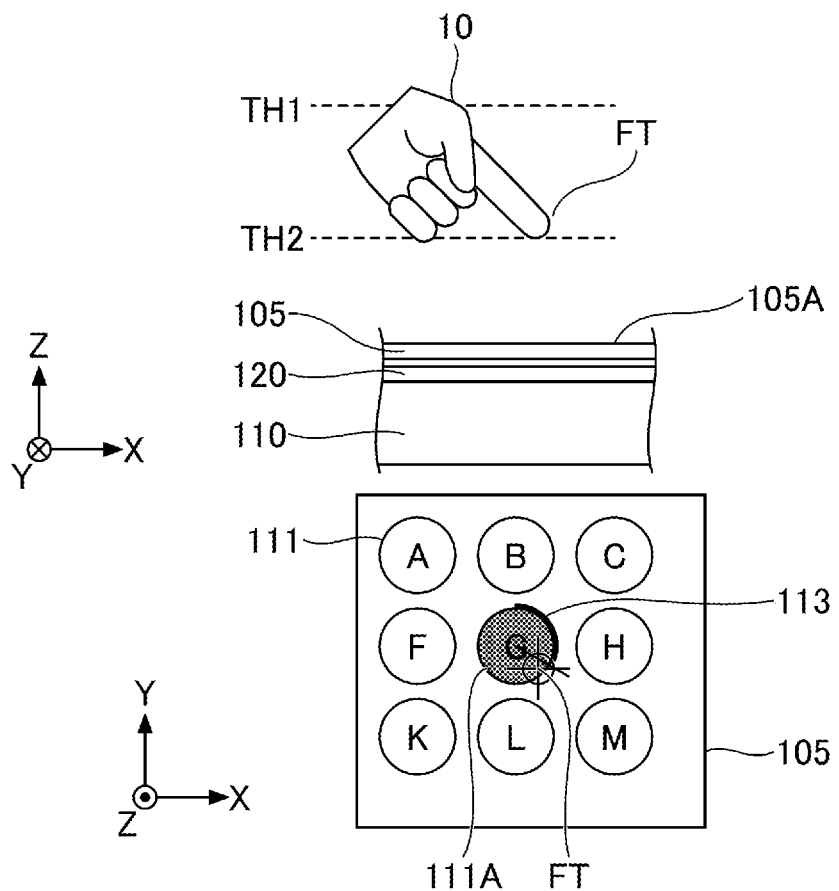
FIG. 6D is a diagram for explaining the time series operation upon selection.

In FIG. 6D, the XY coordinate position of the finger tip FT is within the range of the cursor moving threshold value THC, and the Z-direction position of the finger tip FT reaches the determination threshold value TH2. The diameter of the cursor 112 illustrated in FIG. 6C becomes smaller as the finger tip FT becomes closer to the operation surface 105A, and the cursor 112 assumes the non-displayed state when the Z-direction position of the finger tip FT reaches the determination threshold value TH2. Further, because the determination operation is performed, the plotting of the annular indicator 113 is already started.

Figure 6E:
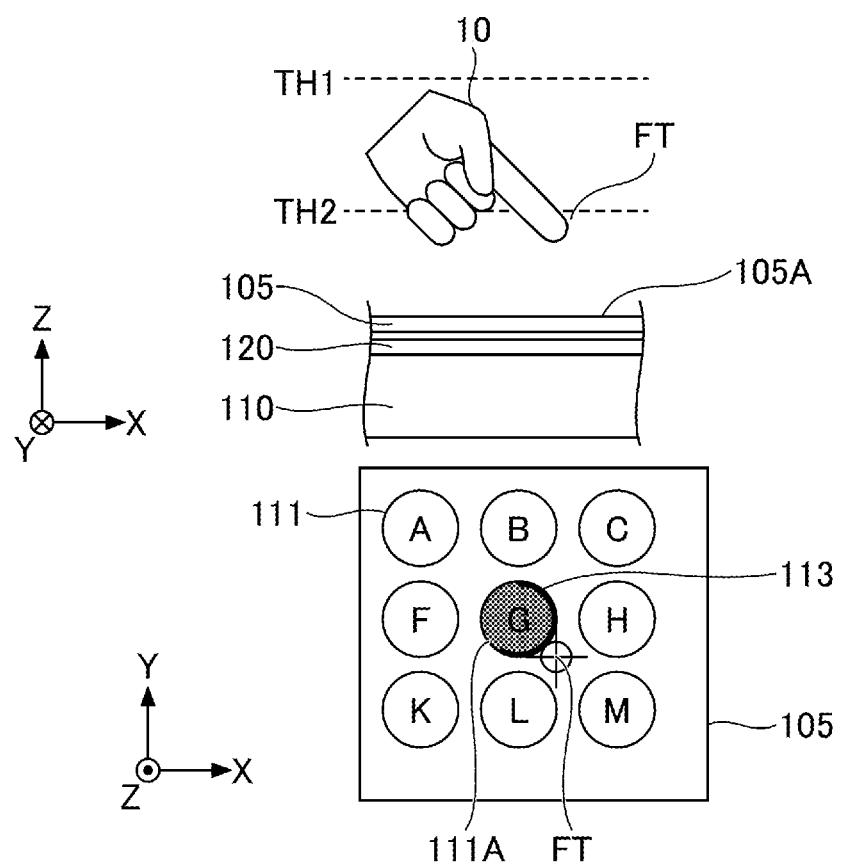
FIG. 6E is a diagram for explaining the time series operation upon selection.

In FIG. 6E, the XY coordinate position of the finger tip FT is within the range of the cursor moving threshold value THC (not illustrated), and the state where the Z-direction position of the finger tip FT reaches the determination threshold value TH2 continues. Although the XY coordinate position of the finger tip FT is outside the GUI button 111, when the GUI button 111 is selected as described above, the selected state of the same GUI button 111 continues as long as the XY coordinate position of the finger tip FT is within the range of the cursor moving threshold value THC. The determination operation continues to be performed from the state illustrated in FIG. 6D, and the indicator of the annular indicator 113 extends to approximately ⅔ of the complete annular shape thereof.

Figure 6F:
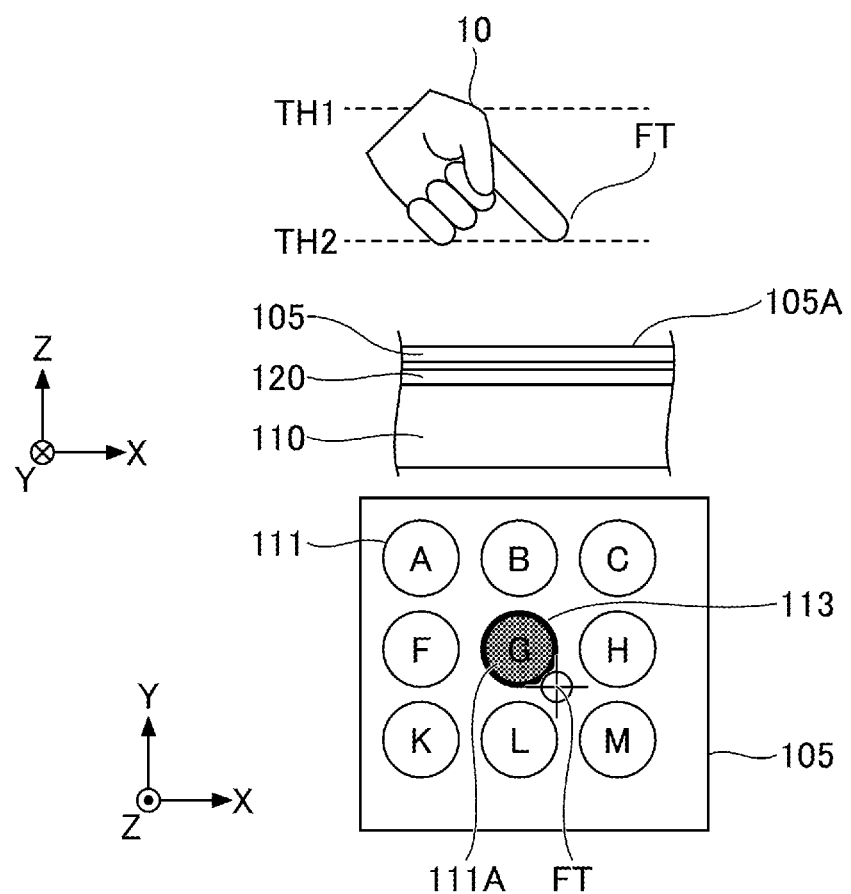
FIG. 6F is a diagram for explaining the time series operation upon selection.

In FIG. 6F, the position of the finger tip FT is separated slightly more from the operation surface 105A when compared to FIG. 6E, but the XY coordinate position of the finger tip FT is outside the GUI button 111 within the range of the cursor moving threshold value THC (not illustrated), and the Z-direction position of the finger tip FT reaches the determination threshold value TH2. The determination operation continues to be performed from the states illustrated in FIG. 6D and FIG. 6E, and the indicator of the annular indicator 113 extends to a state immediately before reaching the complete annular shape thereof by making almost one circle.

Figure 6G:
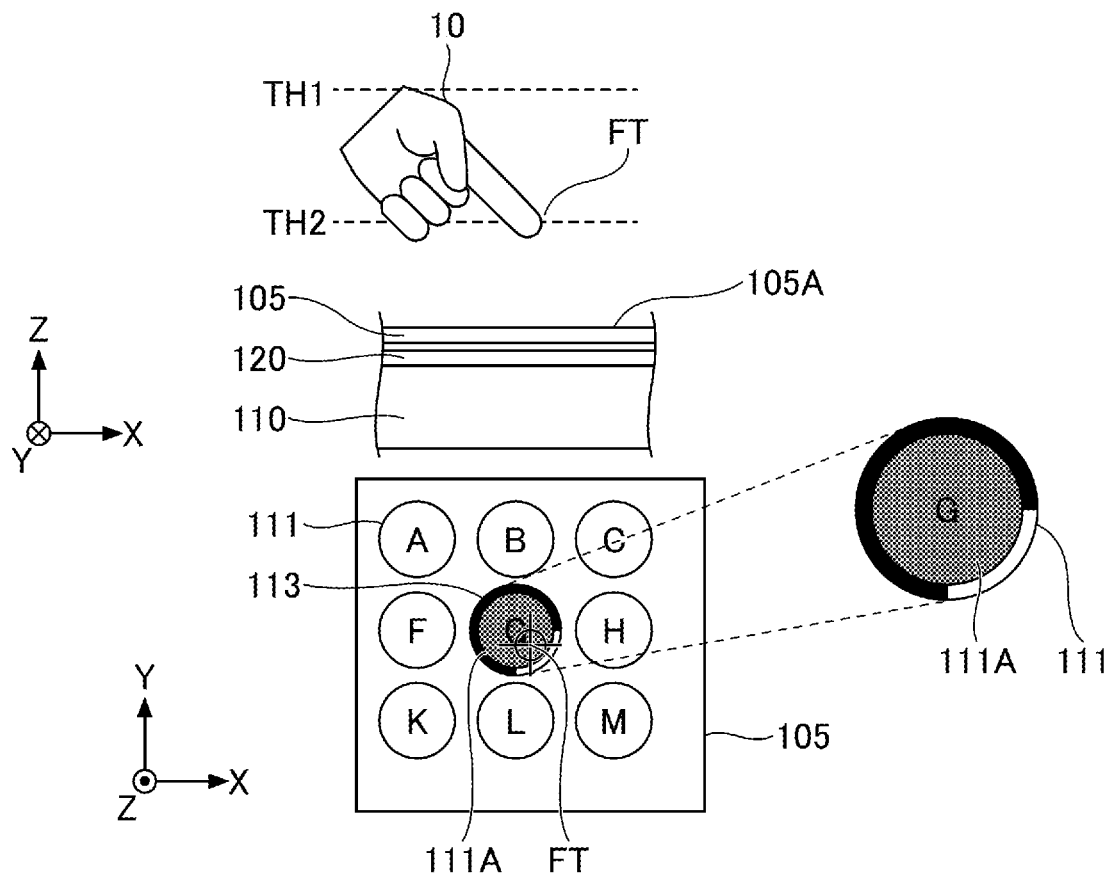
FIG. 6G is a diagram for explaining the time series operation upon selection.

In a state illustrated in FIG. 6G immediately after the state illustrated in FIG. 6F, the indicator of the annular indicator 113 extends to the state reaching approximately the complete annular shape thereof, and the display of the selection circle 111A overlapping the display of the GUI button 111 of G becomes a concave image, thereby determining the input. The indicator of the annular indicator 113 extending to the state reaching approximately the complete annular shape thereof is not illustrated in FIG. 6G. This is because, when the indicator of the annular indicator 113 extends to the state teaching approximately the complete annular shape thereof, the display of the selection circle 111A overlapping the display of the GUI button 111 of the alphabetic key G is switched to the concave shape in order to indicate that the input is determined. The concave shape of the display of the selection circle 111A represents a state where the GUI button 111 is pushed in and becomes deformed to a concave shape.

An example of the GUI button 111 in the state having the concave shape includes a state where light is irradiated from the +Y-direction and the −X-direction, a shadow is formed on the +Y-direction and the −X-direction of the GUI button 111 in the state having the concave shape, and the GUI button 111 in the state having the concave shape is represented by plotting a state where light hits in the −Y-direction and the +X-direction.

Display By Entire Input Device 100

FIG. 7 is a diagram illustrating the input device 100 in a state where the hover input with respect to the selected GUI button 111 is determined. FIG. 7 illustrates the state where the hover input with respect to the GUI button 111 of the alphabetic key G is determined, and when compared to the state illustrated in FIG. 1, the display of the selection circle 111A overlapping the display of the GUI button 111 of the alphabetic key G is changed to an image in a state having the concave shape, and the input content display part 115 displays the alphabetic key G. FIG. 7 illustrates the GUI button 111 of the alphabetic key G on an enlarged scale. Among 45 GUI buttons 111 displayed on the display device 110 of the input device 100, only the GUI button 111 of the alphabetic key G has the image with the concave shape. Hence, the user can visually recognize, from the concave shape of the image of the GUI button 111 of the alphabetic key G, that the input of the GUI button 111 of the alphabetic key G is determined.

Flow Chart

Figure 8:
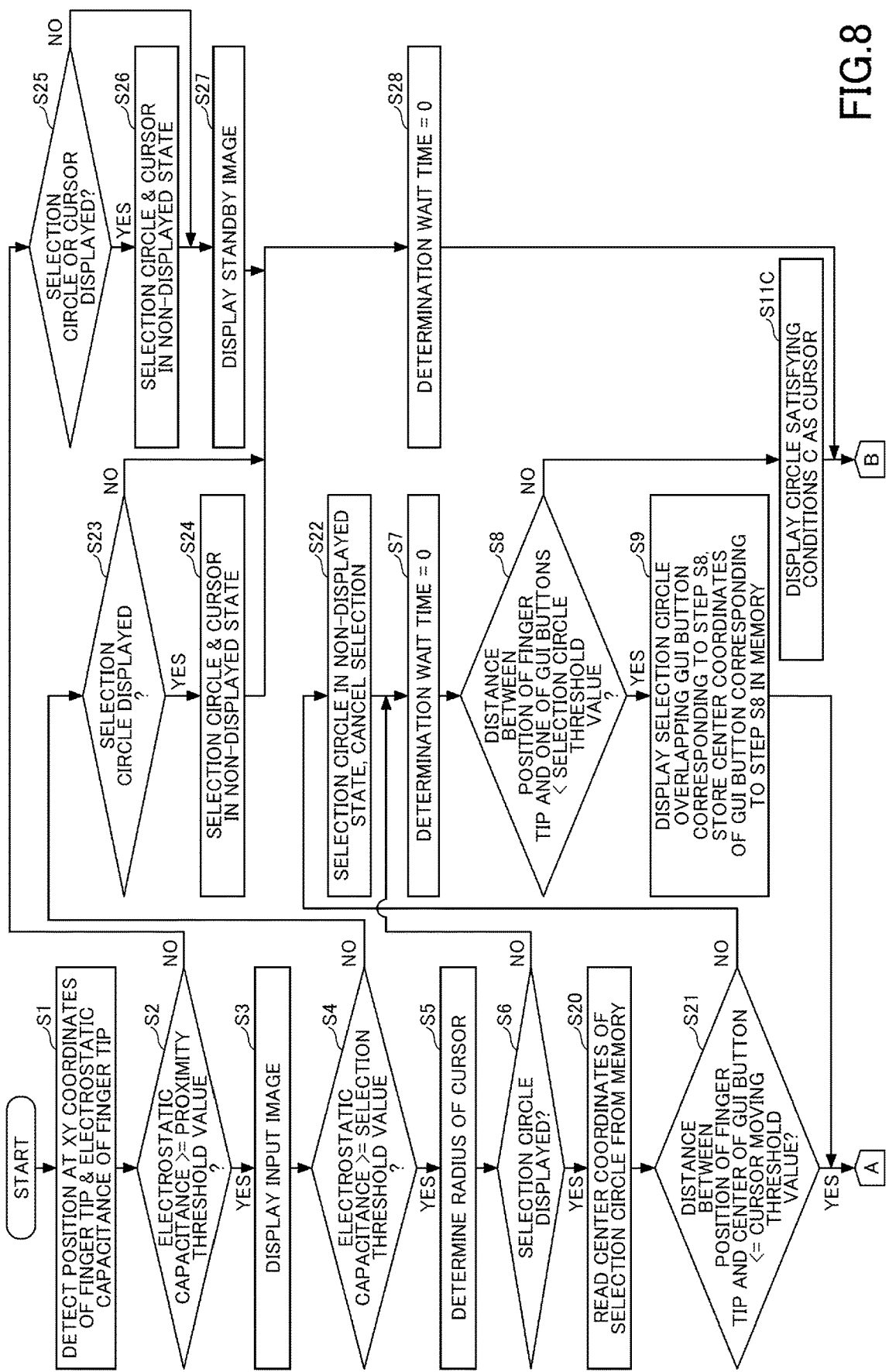
FIG. 8 is a flow chart illustrating a process performed by the control device of the input device.
Figure 9:
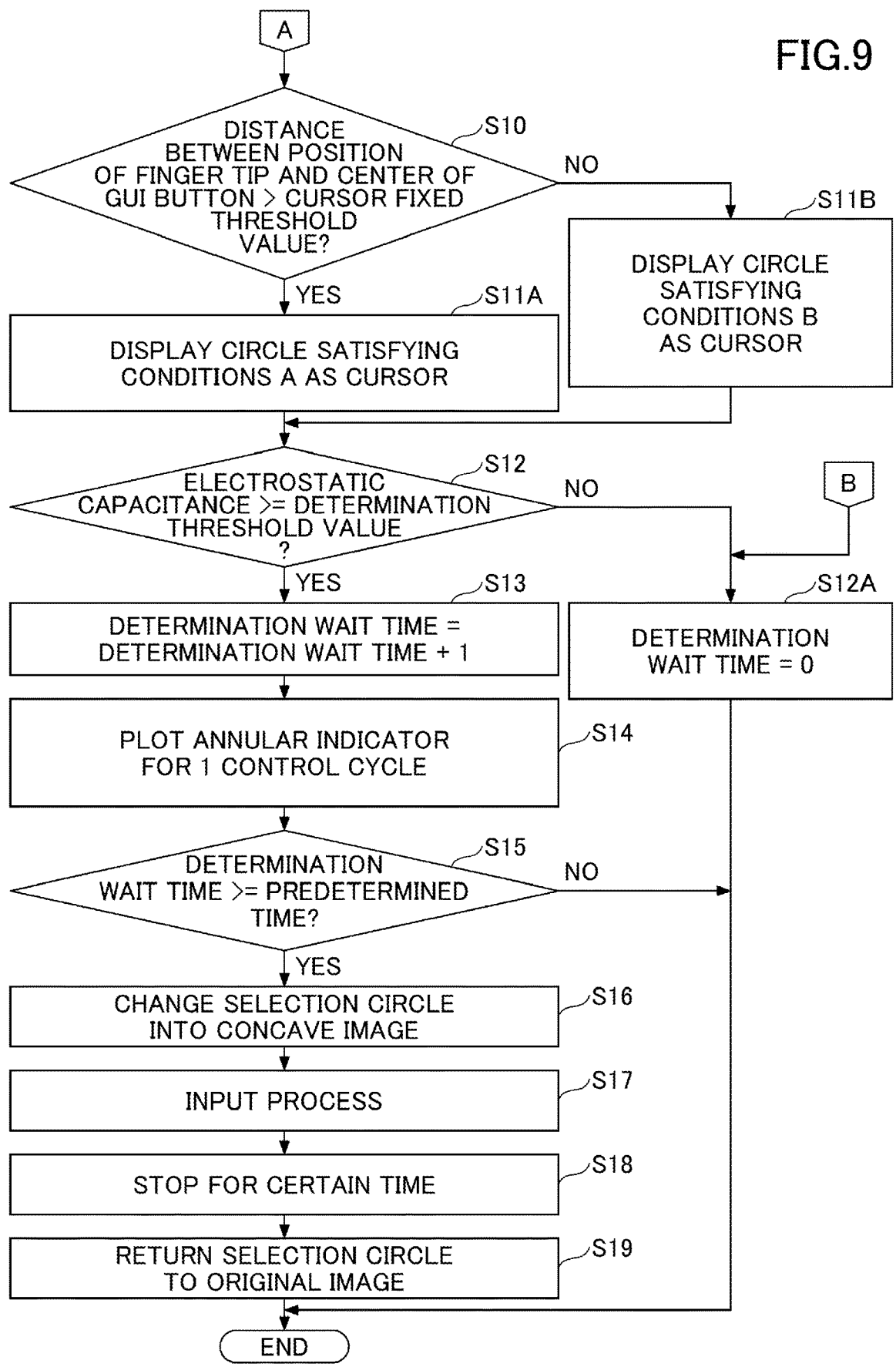
FIG. 9 is a flow chart illustrating the process performed by the control device of the input device.

FIG. 8 and FIG. 9 are flow charts illustrating a process performed by the control device 130 of the input device 100. The process of the flow charts illustrated in FIG. 8 and FIG. 9 is accessed and executed by application software (not illustrated). When the application software is waiting input, the process of the flow charts illustrated in FIG. 8 and FIG. 9, from start to end, is executed repeatedly at a predetermined control cycle.

When the process of the control device 130 starts, the determination unit 134 detects the position (xf, yf) of the finger tip FT in the XY coordinates, and the electrostatic capacitance of the finger tip FT (step S1). The electrostatic capacitance of the finger tip FT corresponds to the Z-direction position of the finger tip FT.

The operation controller 135 determines whether or not the electrostatic capacitance of the finger tip FT is higher than or equal to a proximity threshold value (step S2). The proximity threshold value is a threshold value that determines whether the state of the input device 100 is the standby state illustrated in FIG. 2 or the operating state illustrated in FIG. 1. The electrostatic capacitance represented by the proximity threshold value is lower than the selection threshold value TH1.

When the operation controller 135 determines that the electrostatic capacitance of the finger tip FT is higher than or equal to the proximity threshold value (YES in step S2), the operation controller 135 controls the display controller 136 to display the input image on the display device 110 (step S3).

The operation controller 135 determines whether or not the electrostatic capacitance of the finger tip FT is higher than or equal to the selection threshold value TH1 (step S4).

When the operation controller 135 determines that the electrostatic capacitance of the finger tip FT is higher than or equal to the selection threshold value TH1 (YES in step S4), the operation controller 135 determines the radius rf of the cursor 112 (step S5). Because the radius rf of the cursor 112 is inversely proportional to the electrostatic capacitance, the radius rf may be determined by multiplying a predetermined coefficient to an inverse number of the electrostatic capacitance, for example. The predetermined coefficient may be set to a suitable value so that the cursor 112 having a suitable diameter is obtained according to the electrostatic capacitance, based on a relationship with the diameter of GUI button 111 or the like.

The operation controller 135 determines whether or not the selection circle 111A is displayed (step S6). More particularly, the operation controller 135 determines whether or not the selection circle 111A is displayed by the end of a previous control cycle that is one cycle before a current control cycle, because the selection circle 111A continues to be displayed until the non-displayed state is reached. The process of step S6 is provided to determine whether or not a selected GUI button 111 is present.

When the operation controller 135 determines that the selection circle 111A is not displayed (NO in step S6), the operation controller 135 sets a determination wait time to zero (step S7). The determination wait time is a wait time from the start of the determination operation with respect to the selected GUI button 111 until the input is determined. When the determination wait time reaches a predetermined time, the input with respect to the selected GUI button 111 is determined. The process of step S7 is provided to reset a counted value of a counter that counts the determination wait time. This counter is included in the operation controller 135.

The operation controller 135 determines whether or not the distance between the XY coordinate position of the finger tip FT and the center of one of the GUI buttons 111 is less than the selection circle threshold value THB (step S8). The process of step S8 is provided to determine whether or not the XY coordinate position of the finger tip FT is inside the display area of one of the GUI buttons 111. In other words, when none of the GUI buttons 111 are selected, the process of step S8 is provided to search for the GUI button 111 corresponding to the distance less than the selection circle threshold value THB, from among the distances between the XY coordinate position of the finger tip and the centers of all of the GUI buttons 111.

When the operation controller 135 determines that the distance between the XY coordinate position of the finger tip FT and the center of one of the GUI buttons 111 is less than the selection circle threshold value THB (YES in step S8), the operation controller 135 displays the image of the selection circle 111A to overlap the image of the GUI button 111 with the distance determined in step S8 (step S9). The GUI button 111 with the distance determined in step S8 refers to the GUI button 111 that is determined to have the distance less than the selection circle threshold value THB in step S8, and is the selected GUI button 111. In step S8, the operation controller 135 stores the coordinates of the center of the GUI button 111 with the distance determined in step S8, that is, the coordinates of the center of the selected GUI button 111, in the memory 137.

The operation controller 135 determines whether or not the distance between the XY coordinate position of the finger tip FT and the center of the selected GUI button 111 is greater than the cursor fixing threshold value THA (step S10). The process of step S10 is provided to determine whether or not the XY coordinate position of the finger tip FT is outside the range of the cursor fixing threshold value THA.

When the operation controller 135 determines that the distance between the XY coordinate position of the finger tip FT and the center of the selected GUI button 111 is greater than the cursor fixing threshold value THA (YES in step S10), the operation controller 135 displays a circle satisfying conditions A as the cursor 112 (step S11A). The conditions A include three conditions, namely, that (A1) the center of the cursor 112 is located on a half-linear line having the center of the selected GUI button 111 as one end thereof and passing through the XY coordinate position of the finger tip FT; (A2) the radius rf of the cursor 112 is a value obtained by multiplying a predetermined coefficient to an inverse number of the electrostatic capacitance of the finger tip FT; and (A3) the circle of the GUI button 111 inscribes the circle of the cursor 112. By the process of step S11A, as illustrated in FIG. 6C, for example, the cursor 112 is displayed so that the center of the cursor 112 is offset (or shifted) more toward the center of the GUI button 111 of the alphabetic key G than the XY coordinate position of the finger tip FT, and the circle of the GUI button 111 of the alphabetic key G inscribes the circle of the cursor 112.

In addition, when the operation controller 135 determines that the distance between the XY coordinate position of the finger tip FT and the center of the selected GUI button 111 is not greater than the cursor fixing threshold value THA (NO in step S10), the operation controller 135 displays a circle satisfying conditions B as the cursor 112. The conditions B include two conditions, namely, that (B1) the center of cursor 112 coincides with the center of the selected GUI button 111 of the alphabetic key G; and (B2) the radius rf of cursor 112 is a value obtained by multiplying a predetermined coefficient to an inverse number of the electrostatic capacitance of finger tip FT. By the process of step S11B, as illustrated in FIG. 6B, for example, the cursor 112 is displayed so that the center of the cursor 112 coincides with the center of the selected GUI button 111 of the alphabetic key G.

When the process of step S11A or step S11B ends, the operation controller 135 determines whether or not the electrostatic capacitance of the finger tip FT is higher than or equal to the determination threshold value TH2 (step S12). The process of step S12 is provided to determine whether or not a determination operation is performed with respect to the selected GUI button 111 of the alphabetic key G.

When the operation controller 135 determines that the electrostatic capacitance of the finger tip FT is higher than or equal to the determination threshold value TH2 (YES in step S12), the operation controller 135 increments the determination wait time. That is, the determination wait time is set to (determination wait time)={(determination wait time)+1}. For example, the determination wait time is represented by the counted value that is incremented every time the process of step S13 is performed, and when the counted value reaches a predetermined value corresponding to a predetermined time, the input being performed is determined by the determination operation.

The operation controller 135 controls the display controller 136 to display an arc of $2\pi \times \{(\text{determination wait time})/(\text{predetermined time})\}$ [rad], as the annular indicator 113, along the circumference of the selection circle 111A, so that the display of the selection circle 111A overlaps the display of the selected GUI button 111 of the alphabetic key G.

The operation controller 135 determines whether or not the determination wait time is greater than or equal to the predetermined time (step S15). The process of step S15 is provided to determine whether or not the determination wait time, that is the elapsed time after the determination operation is started, reached the predetermined time, that is an elapsed time until the input is determined.

When the operation controller 135 determines that the determination wait time is greater than or equal to the predetermined time (YES in step S15), the operation controller 135 controls the display controller 136 to change the selection circle 111A to the concave image (step S16), because the input is determined. On the other hand, when the operation controller 135 determines that the determination wait time is not greater than or equal to the predetermined time (NO in step S15), the operation controller 135 ends the series of processes (End). When the series of processes ends, the process returns to Start in FIG. 8, and the processes are repeated.

The operation controller 135 performs an input process (step S17). The input process is provided to display the alphabet, with respect to which the input is determined, in the input content display part 115 illustrated in FIG. 7. For example, as illustrated in FIG. 7, the alphabetic key G is displayed in the input content display part 115.

The operation controller 135 stops for a certain time (step S18). The process of step S18 is provided to continue the state where the selection circle 111A is changed to the concave image for the certain time. When the certain time elapses, the operation controller 135 advances the process of the flow chart to the process of step S19. A length of the certain time may be set so that the user can positively recognize the change of the selection circle 111A to the concave image, The certain time may be set in a range of approximately 0.3 second to approximately 1 second, for example.

The operation controller 135 controls the display controller 136 to return the concave image of the selection circle 111A to the original, non-concave image (step S19). When the process of step S19 ends, the operation controller 135 ends the series of processes (End). When the series of processes ends, the process returns to the process of the application software (not illustrated). In a case where the application software continues to wait for the input, the process returns to Start in FIG. 8, and the processes are repeated. For example, the processes from Start in FIG. 8 to End in FIG. 9 are repeated until an input is made with respect to an enter button on the lower right of the display device 110, that is, until the enter button is activated.

When the operation controller 135 determines that the electrostatic capacitance of the finger tip FT is not higher than or equal to the determination threshold value TH2 (No in step S12), the operation controller 135 resets the determination wait time (step S12A). That is, the operation controller 135 resets the determination wait time to (determination wait time)=0, because no determination operation is performed. When the process of step S12A ends, the operation controller 135 ends the series of processes (End). When the series of processes ends, the process returns to Start in FIG. 8, and the processes are repeated.

In addition, when the operation controller 135 determines that the distance between the XY coordinate position of the finger tip FT and the center of one of the GUI buttons 111 is not less than the selection circle threshold value THB (NO in step S8), the operation controller 135 displays a circle satisfying conditions C as the cursor 112 (step S11C). The conditions C include two conditions, namely, that (C1) the center of the cursor 112 is the position of the finger tip FT, and (C2) the radius rf of the cursor 112 is a value obtained by multiplying a predetermined coefficient to an inverse number the electrostatic capacitance of the finger tip FT. When the process of the flow chart advances to the process of step S11C, the process of step S11C displays the cursor 112 at a position not overlapping any of the GUI buttons 111, as illustrated in FIG. 6A, for example, because the selected GUI button 111 is not present in this case.

In addition, when the operation controller 135 determines that the selection circle 111A is displayed (YES in step S6), the operation controller 135 reads the coordinates of the center of the GUI button 111 whose image overlaps the image of the selection circle 111A on the display, from the memory 137 (step S20). The GUI button 111 whose image overlaps the image of the selection circle 111A on the display, is the selected GUI button 111.

The operation controller 135 determines whether or not the distance between the XY coordinate position of the finger tip FT and the center of the selected GUI button 111 is less than or equal to the cursor moving threshold value THC (step S21). The process of step S21 is provided to determine whether or not the XY coordinate position of the finger tip FT is within the range of the cursor moving threshold value THC.

When the operation controller 135 determines that the distance between the XY coordinate position of the finger tip FT and the center of the selected GUI button 111 is less than or equal to the cursor moving threshold value THC (YES in step S21), the operation controller 135 advances the process of the flow chart to the process of step S10 illustrated in FIG. 9. As described above, the center of the cursor 112 is changed, depending on whether the XY coordinate position of the finger tip FT is outside or within the range of the cursor fixing threshold value THA. For this reason, step S10 determines whether or not the XY coordinate position of the finger tip FT is outside the range of the cursor fixing threshold value THA.

When the operation controller 135 determines that the distance between the XY coordinate position of the finger tip FT and the center of the selected GUI button 111 is not less than or equal to the cursor moving threshold value THC (NO in step S21), the operation controller 135 controls the display controller 136 so that the selection circle 111A assumes the non-displayed state, and cancels (or deselects) the selected GUI button 111 (step S22). In this case, because the position of the finger tip FT exceeds the range of the cursor moving threshold value THC for the selected GUI button 111, the selection circle 111A assumes the non-displayed state, and the selection of the selected GUI button 111 is canceled. When the process of step S22 ends, the process of the flow chart advances to the process of step S7.

When the operation controller 135 determines that the electrostatic capacitance of the finger tip FT is not higher than or equal to the selection threshold value TH1 (NO in step S4), the operation controller 135 determines whether or not the selection circle 111A or the cursor 112 is displayed (step S23). When the operation controller 135 determines that the electrostatic capacitance of the finger tip FT is not higher than or equal to the selection threshold value TH1 (NO in step S4), the accuracy of the XY coordinate position of the finger tip FT is insufficient, and the selection of the GUI button 111 or the display of the cursor 112 cannot be made. A process of switching to the non-displayed state is required when the selected GUI button 111 is present and the selection circle 111A is displayed, or when the cursor 112 is displayed, in the previous control cycle that is one cycle before the current control cycle.

When the operation controller 135 determines that the selection circle 111A is displayed (YES in step S23), the operation controller 135 controls the display controller 136 so that the selection circle 111A and the cursor 112 assume the non-displayed state (step S24). When the process of step S24 ends, the operation controller 135 advances the process of the flow chart to the process of step S12A. Because the selected GUI button 111 is not present (that is, absent), the operation controller 135 resets the determination wait time (step S28).

When the operation controller 135 determines that the selection circle 111A is not displayed (NO in step S23), the operation controller 135 advances the process of the flow chart to the process of step S12A. Because no selection is made and the selection circle 111A is not displayed, the determination wait time is reset to prepare for a next control cycle.

When the operation controller 135 determines that the electrostatic capacitance of the finger tip FT is not higher than the proximity threshold value (NO in step S2), the operation controller 135 determines whether the selection circle 111A or the cursor 112 is displayed (step S25). When the operation controller 135 determines that the electrostatic capacitance of the finger tip FT is not higher than the proximity threshold value (No in step S2), the process of switching to the non-displayed state is required in order to set the input device 100 to the standby state, when the selected GUI button 111 is present and the selection circle 111A is displayed, in the control cycle that is one cycle before the current control cycle.

When the operation controller 135 determines that the selection circle 111A is displayed (YES in step S25), the operation controller 135 controls the display controller 136 so that the selection circle 111A and the cursor 112 assume the non-displayed state (Step 26).

The operation controller 135 controls the display controller 136, so as to display the standby image (step S27). The operation controller 135 may perform a process other than displaying the standby image, such as controlling the CPU to a power save mode, for example.

When the process of step S27 ends, the operation controller 135 advances the process of the flow chart to the process of step S12A. The operation controller 135 resets the determination wait time because the input device is in the standby state.

On the other hand, when the operation controller determines that the selection circle 111A is not displayed (No in step S25), the operation controller 135 advances the process of the flow chart to the process of step S27. Because the selection circle 111A is not displayed, the process of step S26 is skipped.

Advantageous Features or Effects

As described above, when the center of the cursor 112 is aligned to coincide with the XY coordinate position of the finger tip FT, and the selected GUI button 111 protrudes from the cursor 112, the center of the cursor 112 is offset from the XY coordinate position of the finger tip FT, and the selected GUI button 111 is surrounded by the cursor 112, thereby facilitating visual recognition of the selected GUI button 111.

In addition, because the XY coordinate position of the finger tip FT is located in the direction of the center of the cursor 112 when viewed from the center of the GUI button 111, it is possible to provide the input device 100 that enables recognition of the direction of the positional deviation of the finger with respect to the GUI button 111.

Moreover, when the distance between the XY coordinate position of the finger tip FT and the center of the selected GUI button 111 exceeds the cursor fixing threshold value THA, the center of the cursor 112 is offset from the XY coordinate position of the finger tip FT, so that the GUI button 111 inscribes the cursor 112. Hence, even when the offset of the XY coordinate position of the finger tip FT from the center of the GUI button 111 becomes large, it is possible to easily and visually recognize the selected GUI button 111.

Further, when none of the plurality of GUI buttons 111 is selected in the previous control cycle that is one cycle before the current control cycle, the display of the selection circle 111A overlaps the display of the GUI button 111 corresponding to the distance less than the selection circle threshold value THB, among the distances between the XY coordinate position of the finger tip FT and the centers of the plurality of GUI buttons 111. As a result, it is possible to easily and visually recognize the selected GUI button 111.

After the GUI button 111 is selected, when the distance between the XY coordinate position of the finger tip FT and the center of the selected GUI button 111 exceeds the cursor moving threshold value THC, the selection of the GUI button 111 is canceled (or deselected). By using the cursor moving threshold value THC greater than the selection circular threshold value THB used to determine the selection of one of the GUI buttons 111, for determining the cancellation of selection (or deselection), the selected state can be held within a wider range by using a hysteresis characteristic, so that it is possible to prevent the selected GUI button 111 from changing frequently.

The electrostatic sensor 120 detects the electrostatic capacitance between the finger tip FT and the sensor electrodes 121X and 121Y, using the sensor electrodes 121X and 121Y provided along the operation surface 105A, and the size of the cursor 112 is inversely proportional to the magnitude of the electrostatic capacitance. Hence, it is possible to intuitively and visually recognize that the finger tip FT is approaching the operation surface 105A.

When the electrostatic capacitance of the fingertip FT is higher than or equal to the selection threshold value TH1, the selected GUI button 111 is determined based on the XY coordinate position of the finger tip FT. When the electrostatic capacitance of the finger tip FT becomes higher than or equal to the determination threshold value TH2, the size of the GUI button 111 is made to coincide with the size of the cursor 112, and the display of the GUI button 111 is superimposed on the display of the cursor 112. Because the cursor 112 assumes the non-displayed state by becoming hidden on the back side of the GUI button 111, it is possible to visually recognize the extent to which the finger tip FT approaches the operation surface 105A in order for the input to be determined, thereby improving an operability of the input device 100. Further, because the determination threshold value TH2 is greater than the selection threshold value TH1, the operation of determining the input is performed in a state where the finger tip FT is closer to the operation surface 105A than when the operation of selecting the GUI button 111 is performed. The closer the finger tip FT is to the operation surface 105A, the more accurately the XY coordinate position of the finger tip FT can be detected, so that the finger tip FT can be guided to the correct position with respect to the GUI button 111 for which the input is to be determined, thereby enabling the input to be determined with a high accuracy.

In addition, because the input is determined in the state where the electrostatic capacitance is higher than or equal to the determination threshold value TH2 continues for the predetermined time, the control device 130 can prevent an unintended input from becoming determined in a case where the user unintentionally moves the finger tip FT to a position momentarily opposing the GUI button 111. That is, it is possible to prevent an erroneous input.

Moreover, because the cursor 112 is plotted (or displayed) more on the back side of the selected GUI button 111, and the cursor 112 is plotted (or displayed) more in the front of the GUI buttons 111 other than the selected GUI button 111, it is possible to clearly distinguish the selected GUI button 111 and the unselected GUI buttons 111 from one another, and clearly recognize the unselected GUI buttons 111 and the selected GUI button 111. Further, because the selected GUI button 111 becomes visible relative to the unselected GUI buttons 111 as if the selected GUI button 111 were floating above the unselected GUI buttons 111, it is easier to visually recognize that the contactless hover input can be made with respect to the operation surface 105A, thereby making it is easier to utilize the contactless operation.

Further, because the cursor 112 has the convex shape, it is easy to determine whether or not the selected GUI button 111 protrudes from the cursor 112.

Also, because the cursor 112 has the circular shape, it is easy to determine whether or not the selected GUI button 111 protrudes from the cursor 112.

Modifications

In the description given heretofore, the cursor fixing threshold value THA is a fixed value, however, the cursor fixing threshold value THA may be a variable. For example, in a case where the diameter of the GUI button 111 is rs, the radius rf of the cursor 112 may be used to set the radius ra of the cursor fixing threshold value THA to a variable (rf−rs).

In this case, the radius ra of the cursor fixing threshold value THA may be represented by the following formula (2).

$$Ra = rf - rs \quad (2)$$

For example, when determining whether or not the distance D between the XY coordinate position of the finger tip FT and the center of the selected GUI button 111 is greater than the radius ra of the cursor fixing threshold value THA in step S10, the radius ra of the cursor fixing threshold value THA may be varied according to the formula (2), depending on the radius rf of the cursor 112 that varies according to the inverse number of the electrostatic capacitance of the finger tip FT.

When the radius ra of the cursor fixing threshold value THA is varied according to the formula (2), and the finger tip FT approaches the operation surface 105A and the size of the cursor 112 decreases, the range of the cursor fixing threshold value THA also decreases. On the other hand, when the finger tip FT moves away from the operation surface 105A and the size of the cursor 112 increases, the range of the cursor fixing threshold value THA also increases.

Accordingly, compared to the case where the radius ra of the cursor fixing threshold value THA is a fixed value, the position of the cursor 112 is not offset toward the center of the GUI button 111 so that the GUI button 111 inscribes the cursor 112, when the finger tip FT is separated and relatively distant from the operation surface 105A, and the XY coordinate position of the finger tip FT is just outside the range of the cursor fixing threshold value THA for the case where the XY coordinate position of the finger tip FT is a fixed value, for example.

When the user moves the finger tip FT close to the operation surface 105A to determine the input and the cursor 112 is relatively small, and the XY coordinate position of the finger tip FT is just within the range of the cursor fixing threshold value THA, for example, the GUI button 111 may protrude from the cursor 112 in the case where the cursor fixing threshold value THA is a fixed value. In such a case, by making the cursor fixing threshold value THA a variable as described above, the radius ra of the cursor fixing threshold value THA becomes smaller than that of the case where the cursor fixing threshold value THA is the fixed value, and it is possible to increase the probability of the GUI button 111 inscribing the cursor 112. For this reason, it is possible to reduce the probability of the GUI button 111 protruding from the cursor 112.

Accordingly, according to the modification of the embodiment, by varying the radius ra of the cursor fixing threshold value THA according to the formula (2), it is possible to provide the input device 100 that enables a direction of a positional deviation of the finger with respect to the GUI button 111 to be more easily recognized.

In the case where the cursor fixing threshold value THA is set to a fixed value, a computation amount of the control device 130 can be reduced. For this reason, it is possible to obtain advantageous features or effects, such as reducing a capacity of the memory 137 or the like. Accordingly, whether to set the cursor fixing threshold value THA to a fixed value or a variable, may be determined based on a comprehensive judgment.

According to one aspect of the present disclosure, it is possible to provide an input device that enables easy recognition of a selected GUI button, even when a spacing between two mutually adjacent GUI buttons is narrow.

Although examples of the input device according to the embodiments and modifications of the present invention are described heretofore, the present invention is not limited to the specifically disclosed embodiments, and various variations, modifications, and substitutions may be made without departing from the scope of the present invention.

What is claimed is:

1. An input device comprising:
a top panel having an operation surface;
a display configured to display an image of at least one GUI button visible through the operation surface;
a detector configured to detect a center position of a finger facing the operation surface, and a distance from the operation surface to the finger; and
a controller configured to control the image displayed on the display based on an output of the detector, and to determine a presence or an absence of an input with respect to the GUI button,
wherein the controller performs a process including
displaying an image of a cursor on the display at a position opposing the finger, based on the center position of the finger,
varying a size of the cursor according to the distance between the operation surface and the finger,
determining a selected GUI button of the at least one GUI button, based on the center position of the finger,
providing a cursor fixing threshold value, and matching a center position of the cursor with the center position of the finger, when a distance between the center position of the finger and a center position of the selected GUI button is within the cursor fixing threshold value, and
offsetting the center position of the cursor from the center position of the finger, and surrounding the selected GUI button with the cursor, when the distance between the center position of the finger and the center position of the selected GUI button exceeds the cursor fixing threshold value, and the selected GUI button protrudes from the cursor if the center position of the cursor is aligned to match the center position of the finger.

2. The input device as claimed in claim 1, wherein the controller offsets the center position of the cursor from the center position of the finger so that the GUI button inscribes the cursor, and locates the center position of the cursor on a line passing the center position of the selected GUI button and the center position of the finger, when the distance between the center position of the finger and the center position of the selected GUI button exceeds the cursor fixing threshold value.

3. The input device as claimed in claim 1, wherein
the display displays a plurality of the GUI buttons, and the controller displays, on the display, a selection circle in an overlapping manner to a GUI button corresponding to a distance less than a selection circle threshold value, among distances between the center position of the finger and center positions of the plurality of GUI buttons, when none of the plurality of GUI buttons is selected.

4. The input device as claimed in claim 3, wherein the controller deselects the selected GUI button when the distance between the center position of the finger and the center position of the selected GUI button exceeds a cursor moving threshold value that is greater than the selection circle threshold value, after the GUI button is selected.

5. The input device as claimed in claim 1, wherein
the detector detects an electrostatic capacitance between the finger and electrodes provided along the operation surface,
the size of the cursor is inversely proportional to a magnitude of the electrostatic capacitance, and
an inverse number of the electrostatic capacitance is multiplied by a predetermined coefficient to match a size of the selected GUI button with the size of the cursor, when the electrostatic capacitance of the finger is higher than or equal to a determination threshold value.

6. The input device as claimed in claim 5, wherein the controller further performs the process including
determining the selected GUI button of the at least one GUI button, based on the center position of the finger, when the electrostatic capacitance is higher than or equal to a selection threshold value, the determination threshold value being greater than the selection threshold value, and
displaying the GUI button on the display, in an overlapping manner to the cursor so that the cursor is in a non-displayed state, when the size of the cursor is equal to or smaller than the size of the GUI button.

7. The input device as claimed in claim 6, wherein the controller further performs the process including
displaying an annular indicator when the electrostatic capacitance is higher than or equal to the determination threshold value, the annular indicator being configured to extend in an annular shape and reach a complete annular shape when an input is determined, and
determining the input when a state where the electrostatic capacitance is higher than or equal to the determination threshold value continues for a predetermined time, making the annular indicator in a non-displayed state, and displaying the GUI button as a concave image.

8. The input device as claimed in claim 1, wherein
the display displays a plurality of the GUI buttons, and
the controller displays, on the display, the cursor on a back side of the selected GUI button, and displays the cursor in front of GUI buttons other than the selected GUI button, in a state where the cursor has gray or other color.

9. The input device as claimed in claim 1, wherein the cursor has a convex shape.

10. The input device as claimed in claim 9, wherein the cursor has a circular shape.

11. The input device as claimed in claim 1, wherein
the GUI button is transparent,
the controller displays, on the display, a selection circle so that the transparent GUI button is displayed in front of the selection circle, and the selection circle is displayed in front of the cursor.

* * * * *